(12) United States Patent
Boons et al.

(10) Patent No.: US 12,503,506 B2
(45) Date of Patent: Dec. 23, 2025

(54) DUAL DRUG ANTIBODY-DRUG CONJUGATES

(71) Applicant: UNIVERSITY OF GEORGIA RESEARCH FOUNDATION, INC., Athens, GA (US)

(72) Inventors: Geert-Jan Boons, Athens, GA (US); Xiuru Li, Athens, GA (US)

(73) Assignee: UNIVERSITY OF GEORGIA RESEARCH FOUNDATION, INC., Athens, GA (US)

( * ) Notice: Subject to any disclaimer, the term of this patent is extended or adjusted under 35 U.S.C. 154(b) by 1036 days.

(21) Appl. No.: 17/621,749

(22) PCT Filed: Jun. 24, 2020

(86) PCT No.: PCT/US2020/039314
§ 371 (c)(1),
(2) Date: Dec. 22, 2021

(87) PCT Pub. No.: WO2020/263943
PCT Pub. Date: Dec. 30, 2020

(65) Prior Publication Data
US 2022/0249681 A1 Aug. 11, 2022

Related U.S. Application Data

(60) Provisional application No. 62/865,692, filed on Jun. 24, 2019.

(51) Int. Cl.
*A61K 47/68* (2017.01)
*A61K 47/54* (2017.01)
(Continued)

(52) U.S. Cl.
CPC ........ *C07K 16/2803* (2013.01); *A61K 47/545* (2017.08); *A61K 47/549* (2017.08);
(Continued)

(58) Field of Classification Search
None
See application file for complete search history.

(56) References Cited

U.S. PATENT DOCUMENTS

2012/0309940 A1   12/2012   Fischer et al.
2015/0031861 A1   1/2015    Smith et al.
(Continued)

FOREIGN PATENT DOCUMENTS

WO   2015/057066 A1      4/2015
WO   WO-2018036403 A1 *  3/2018   ........... A61K 31/542

OTHER PUBLICATIONS

Machine translation of WO 2018036403 downloaded Apr. 24, 2025 from: https://patents.google.com/patent/WO2018036403A1/en?oq=WO+2018036403 (Year: 2018).*
Search Report issued in corresponding EP Application No. 20830946.8 dated Jun. 26, 2023, 9 pages.
Manabe et al. "Characterization of Antibody Products Obtained through Enzymatic and Nonenzymatic Glycosylation Reactions with a Glycan Oxazoline and Preparation of a Homogeneous Antibody–Drug Conjugate via Fe N—Glycan", Bioconjugate Chemistry, vol. 30, No. 5, May 15, 2019 (May 15, 2019), pp. 1343-1355.

(Continued)

*Primary Examiner* — Karl J Puttlitz
(74) *Attorney, Agent, or Firm* — Meunier Carlin & Curfman LLC

(57) ABSTRACT

Disclosed herein are dual drug antibody drug conjugates with defined stoichiometric ratios of each drug. The conjugates disclosed herein are useful for the treatment of cancer, particularly drug resistant and multidrug resistance cancer.

20 Claims, 7 Drawing Sheets

(51) Int. Cl.
*A61K 47/55* (2017.01)
*A61P 35/00* (2006.01)
*C07K 16/28* (2006.01)

(52) U.S. Cl.
CPC ........ *A61K 47/552* (2017.08); *A61K 47/6803* (2017.08); *A61P 35/00* (2018.01)

(56) References Cited

U.S. PATENT DOCUMENTS

2019/0169293 A1* 6/2019 Iwamoto ................ C12N 15/09
2020/0261594 A1* 8/2020 Toda ................ A61K 47/68035

OTHER PUBLICATIONS

International Search Report and Written Opinion issued in PCT/US2020/039314, dated Oct. 6, 2020, 8 pages.

Zeitlin et al. "Enhanced potency of a fucose-free monoclonal antibody being developed as an Ebola virus Immunoprotectant," Proceedings of the National Academy of Sciences of the United States of America, Dec. 20, 2011 (Dec. 20, 2011), vol. 108, pp. 20690-20694.

* cited by examiner

DUAL DRUG ANTIBODY-DRUG CONJUGATES

CROSS-REFERENCE TO RELATED APPLICATION

This is a national stage application filed und 35 U.S.C. § 371 of International Application No. PCT/US2020/039314, entitled "DUAL DRUG ANTIBODY-DRUG CONJUGATES," filed Jun. 24, 2020, which claims the benefit of U.S. Provisional Application 62/865,692, filed on Jun. 24, 2019, the contents of which are hereby incorporated in their entirety.

STATEMENT OF GOVERNMENT SUPPORT

This invention was made with government support under R01CA88986 by the National Institutes of Health. The government has certain rights in the invention

FIELD OF THE INVENTION

This invention is directed to antibody-drug conjugates having multiple agents conjugated to the same antibody. The methods disclosed herein permit selective installation of agents in pre-determined stoichiometric ratios.

BACKGROUND

Antibody-drug conjugates (ADCs) are emerging as attractive therapeutics for the treatment of cancer owing their ability to selectively deliver a cytotoxic drug to cells overexpressing a tumor-associated antigen. Four ADCs have been approved by the US food and drug administration for the treatment of relapsed Hodgkin lymphoma, anaplastic large-cell lymphoma, metastatic breast cancer, and relapsed or refractory B-cell precursor acute lymphoblastic leukemia. In addition, more than 200 ADCs are undergoing clinical evaluation for the treatment of many other types of cancer.

Drug-resistance in cancer is the major impediment to a successful treatment of cancer. Multidrug-resistance (MDR) in cancer cells is a phenotype whereby cells display a reduced sensitivity to chemotherapeutic compounds based on several mechanisms in particular including an increase in drug efflux. Said multidrug-resistance can be a pre-existing one and, thus, evident at the onset of therapy (intrinsic) or alternatively be acquired after onset of therapy. One of the best characterized mechanisms of multidrug resistance is the increased drug efflux mediated by ATP-binding cassette (ABC) transporters, in particular P-glycoprotein (P-gp, MDR1, ABCB1). ABC proteins, present in all living organisms from prokaryotes to mammals, are transmembrane proteins that control the passage of their substrates across membrane barriers. ABC transporters make up a complex cellular defense system responsible for the recognition and the energy-dependent removal of environmental toxic agents entering the cells or organisms. In cancer, P-glycoprotein acts as a primary shield that keeps intracellular chemotherapy drug levels below a cell-killing threshold. Cancer cells overexpressing P-glycoprotein become multi-drug resistant, as the promiscuity of P-glycoprotein (P-gp) allows the efflux of most clinically used anticancer agents. The contribution of P-gp to poor chemotherapy response has been demonstrated in hematological malignancies, sarcomas, breast cancer, and other solid cancers. Recently, acquired doxorubicin resistance was associated with increased expression of the mouse Mdr1 genes in a genetically engineered mouse model for BRCA 1-related breast cancer. Significantly, even moderate increases of Mdr1 expression were found to be sufficient to cause doxorubicin resistance, which could be reversed by the third-generation P-gp inhibitor tariquidar. These results confirm that P-gp indeed plays a pivotal role in causing drug resistance in a realistic model of cancer. In particular, it is attractive to develop dual-drug ADCs that can overcome multidrug resistance. Many P-gp inhibitors or modulators have failed in the clinical trials due to high systemic toxicity, off-target toxicity due to MDR1 expression by normal tissue, and poor pharmacokinetic properties. Commonly employed cytotoxic compounds for the development of ADCs such as calicheamicin, monomethyl auristatin E (MMAE), paclitaxel and maytansinoids are substrates of P-glycoprotein (P-gp) resulting in poor activity against multidrug resistant cancers.

Drug combinations with non-overlapping toxicity profiles and differential modes of action are commonplace in cancer therapy and based on this practice, several ADCs are being combined with unconjugated clinically approved drugs. Potentially, a more attractive approach for multidrug delivery is the functionalization of an antibody with several different drugs. In a proof of concept study, Senter and coworkers described a dual drug ADC in which a drug carrier containing two orthogonally protected cysteine residues was ligated to an antibody followed by selective deprotection of the cysteine residues and sequential attachment of two different thio-reactive monomethyl auristatin derivatives that possess complementary properties. Although conceptually elegant, the need to reduce interchain disulfide bonds for attachment of the drug carrier, the use of a toxic metal for deprotection of an acetamidomethyl (Acm) protecting group and the very high drug loading, represent potential drawbacks of this approach. Another heterofunctional linker has been reported for the attachment of two warhead but also required toxic reagents for functionalization. There is an urgent need to develop mild, non-genetic, and site-specific conjugation technologies for the attachment of several drugs to an antibody.

There remains a need for ADCs with controllable levels of therapeutic agents conjugated to the antibody. There remains a need for methods to selectively install a desired number of drug cargos onto an antibody, without relying on toxic or otherwise problematic reagents. There remains a need for improved methods for preparing dual-drug ADCs. There remains a need for methods treating multidrug resistant cancers, including cancers characterize by P-gp overexpression. The remains a need for methods to selectively deliver P-gp inhibitors or modulators to cancerous tissues within acceptable toxicity levels.

SUMMARY

Disclosed herein are antibody-drug conjugates features two or more conjugated cargo moieties, for instance, therapeutic agents, diagnostic agents, and the like. The ADCs disclosed herein have controlled stoichiometric ratios for the conjugated moieties. In some embodiments, the dual drug ADCs include at least one chemotherapeutic agent and at least one agent that enhances the effectiveness of the chemotherapeutic agent.

The details of one or more embodiments are set forth in the descriptions below. Other features, objects, and advantages will be apparent from the description and from the claims.

Cell viability was assessed by MTT assay. Data were fitted using Prism nonlinear regression software.

Figure 1:
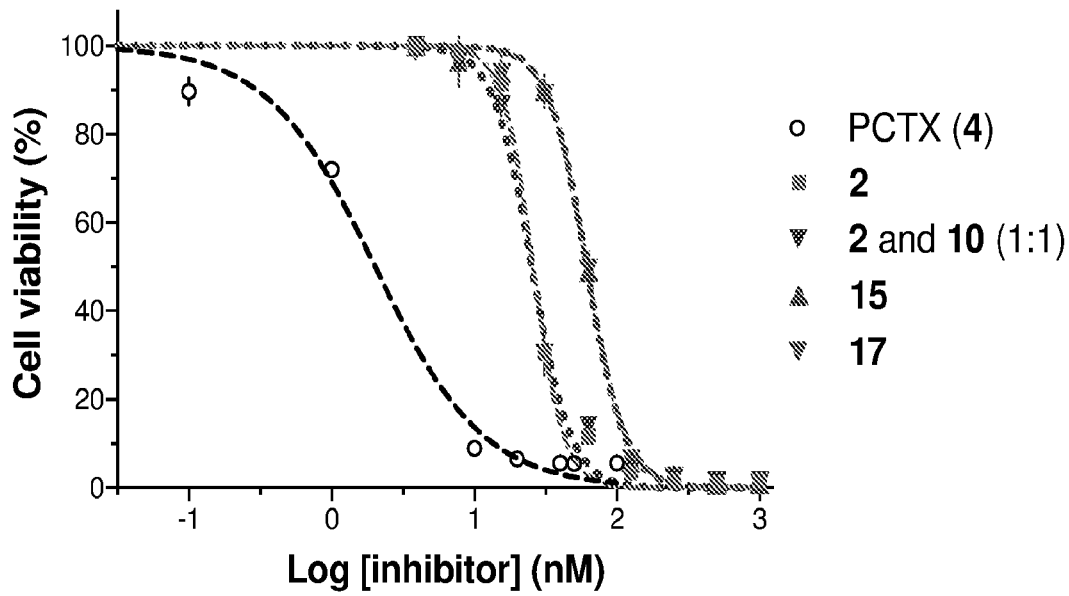
FIG. 1 depicts in vitro cytotoxicity profiles of various constructs in Namalwa A) wild type and B) MDR+ve cells.
Figure 1:
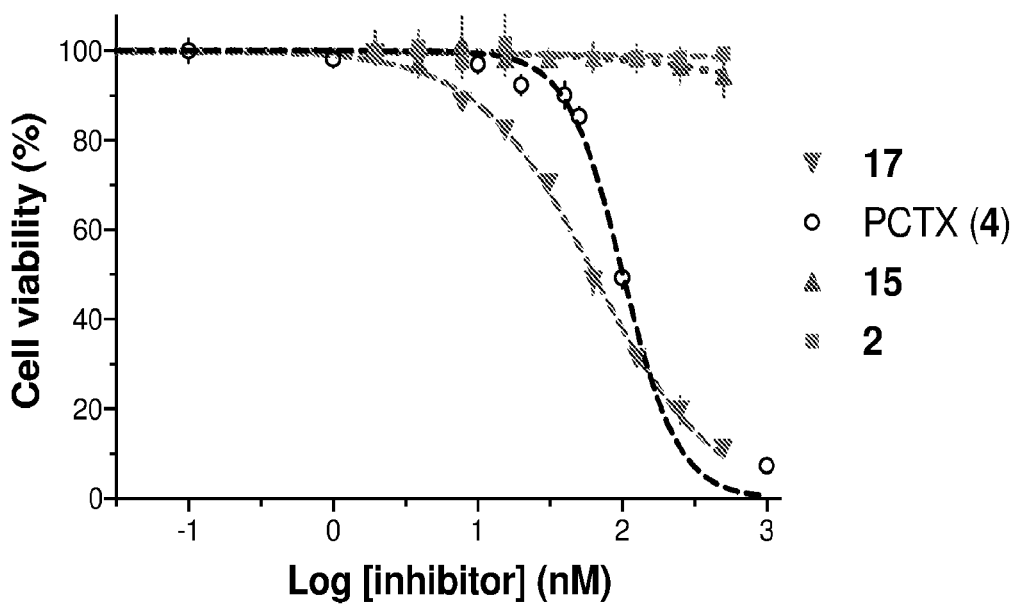
Figure 2:
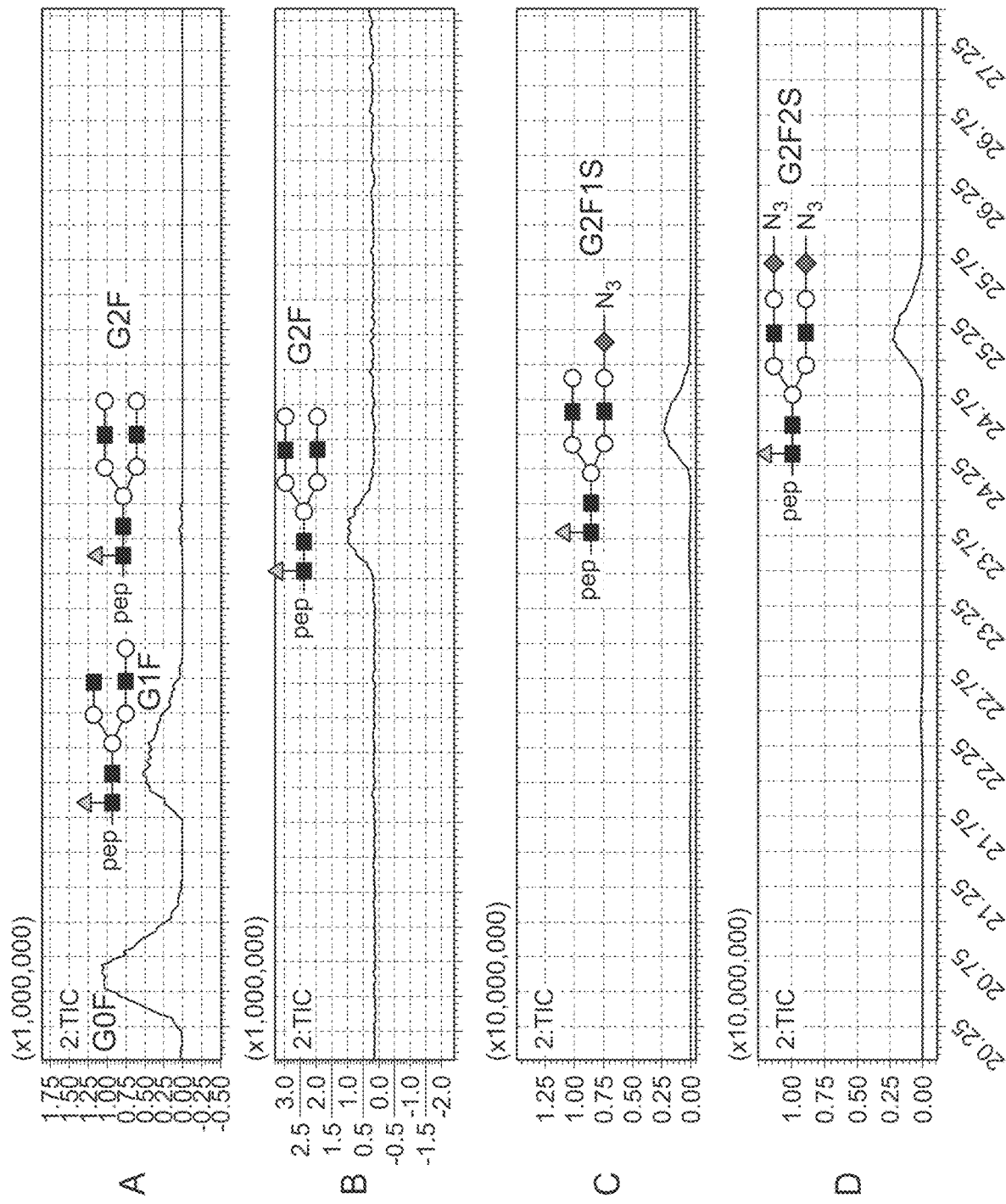

FIG. 2 depicts HILIC-LC/MS spectra of glycopeptides from tryptic digestion of antibodies: A) antibody 12; B) antibody antibody 13; C) antibody 14; and D) antibody 13 modified by ST6Gal I in the presence of 1 at 25:1 molar ratio of compound 1 to antibody 13.

Figure 3:
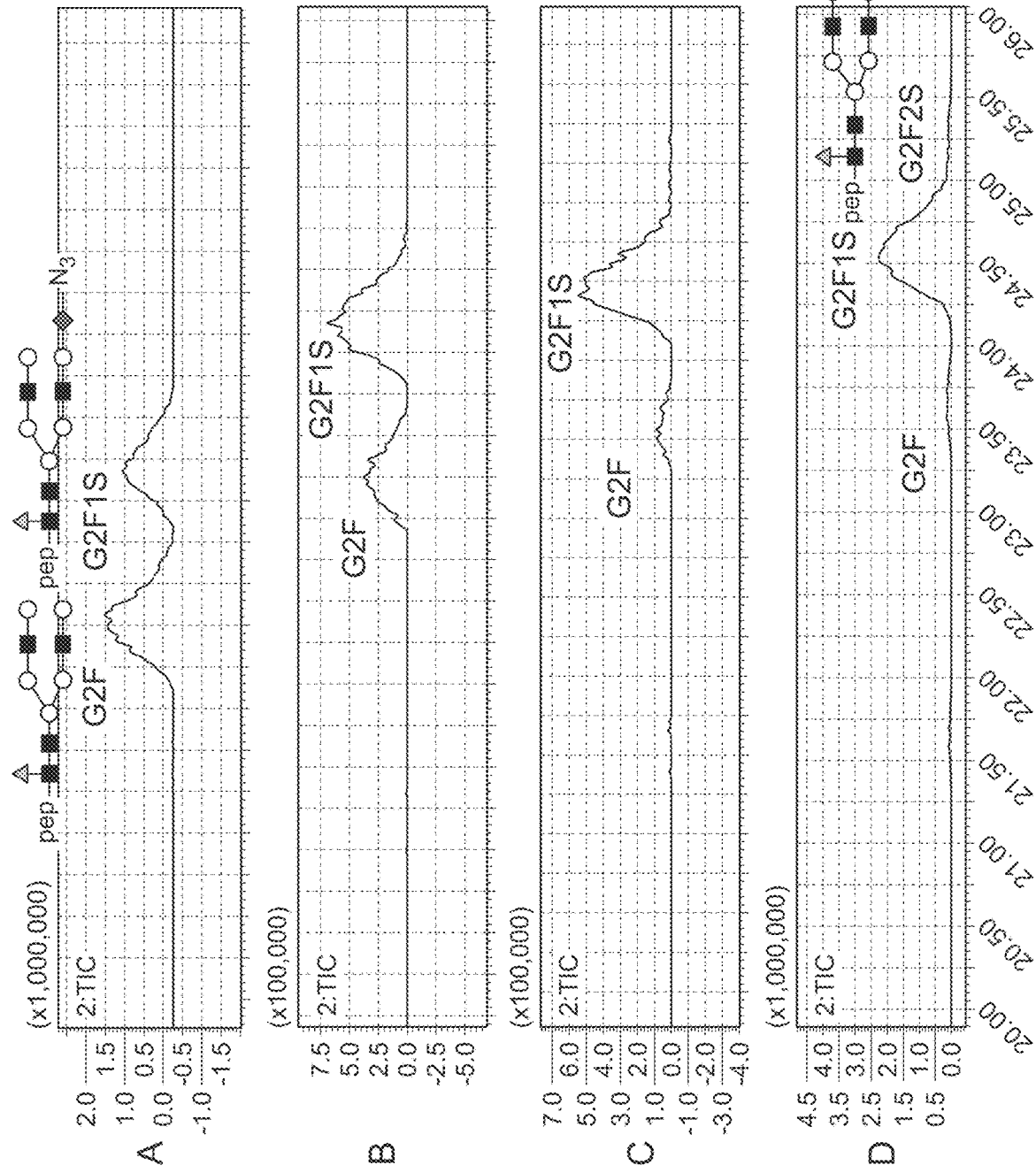

FIG. 3 depicts HILIC-LC/MS spectra of glycopeptides from tryptic digestion of 13 modified by ST6Gal I in the presence of compound 1 at different molar ratios of compound 1 to antibody 13: A) 2:1; B) 3:1; C); 3.5:1, and D) 4:1.

Figure 4:
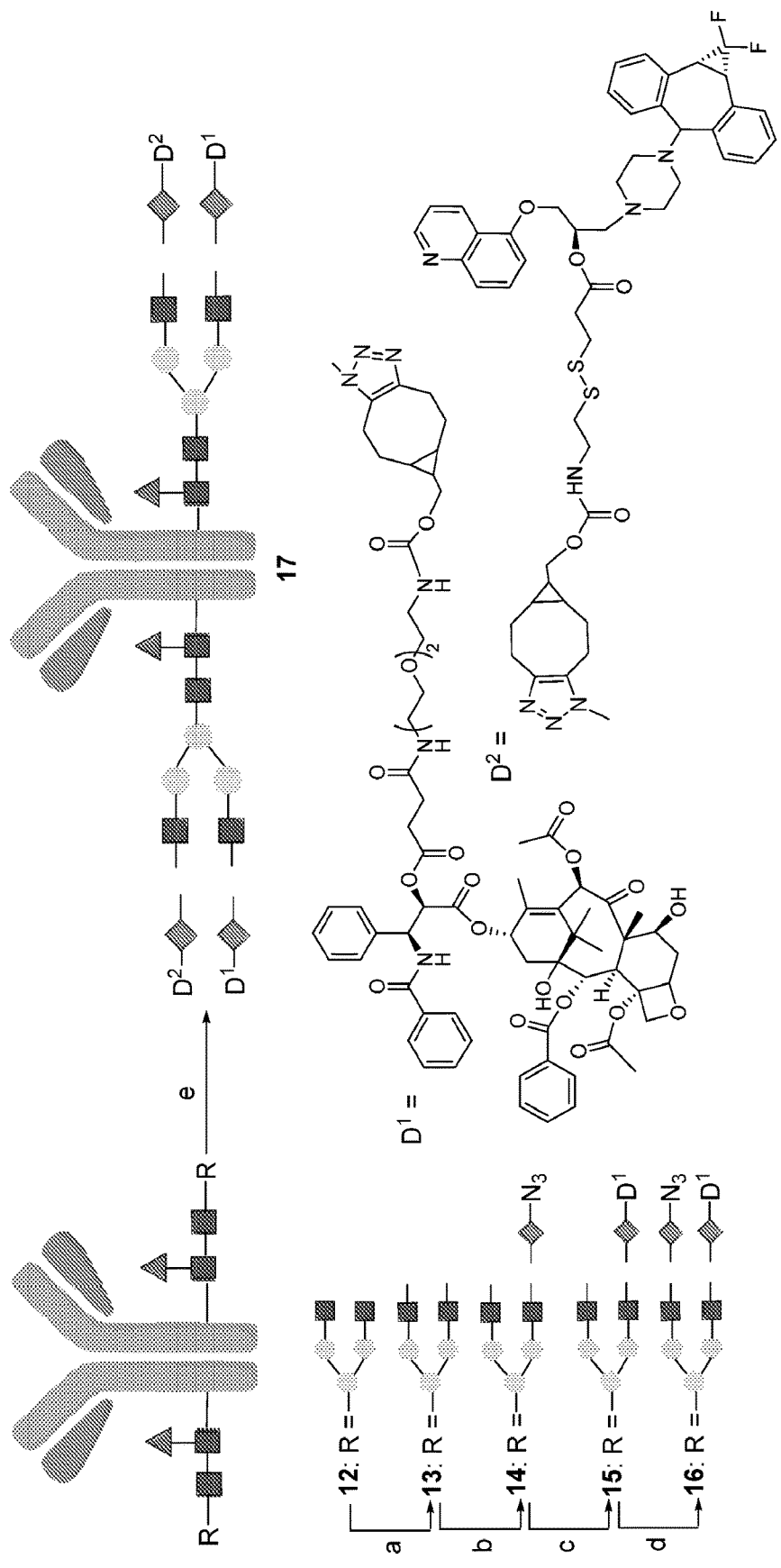

FIG. 4 depicts a remodeling and conjugation process to install both a taxoid and zosuquidar based cargo moieties. Reagents and conditions: a) UDP-Gal, galactosyltransferase, MOPS buffer, pH 7.2; b) azide functionalized sialoside, ST6Gal1, CLAP; c) (D$^1$); d) azide functionalized sialoside, ST6Gal1, CIAP; e) (D$^2$). The reactions for a-e were performed in cacodylate buffer, pH 7.6.

Figure 5A:
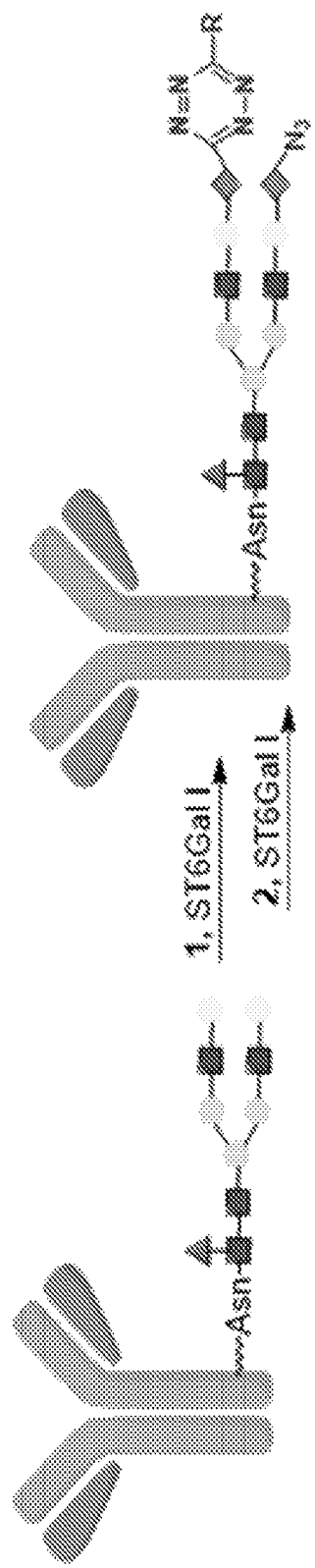
Figure 5B:
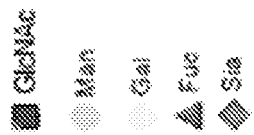
Figure 5B:
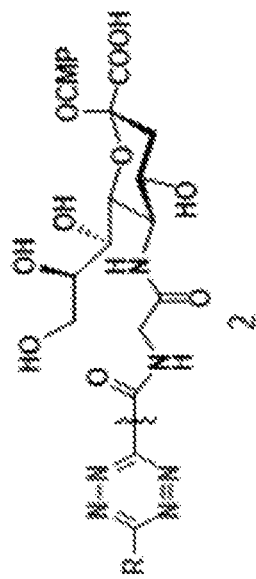
Figure 5B:
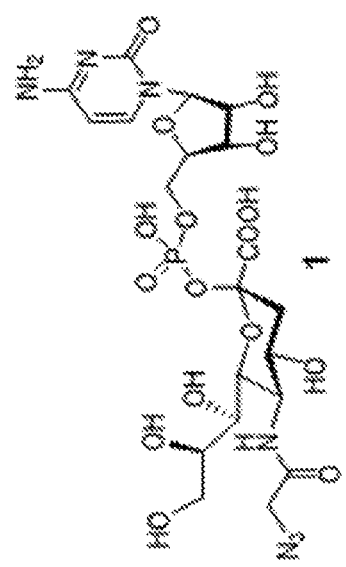
Figure 5C:
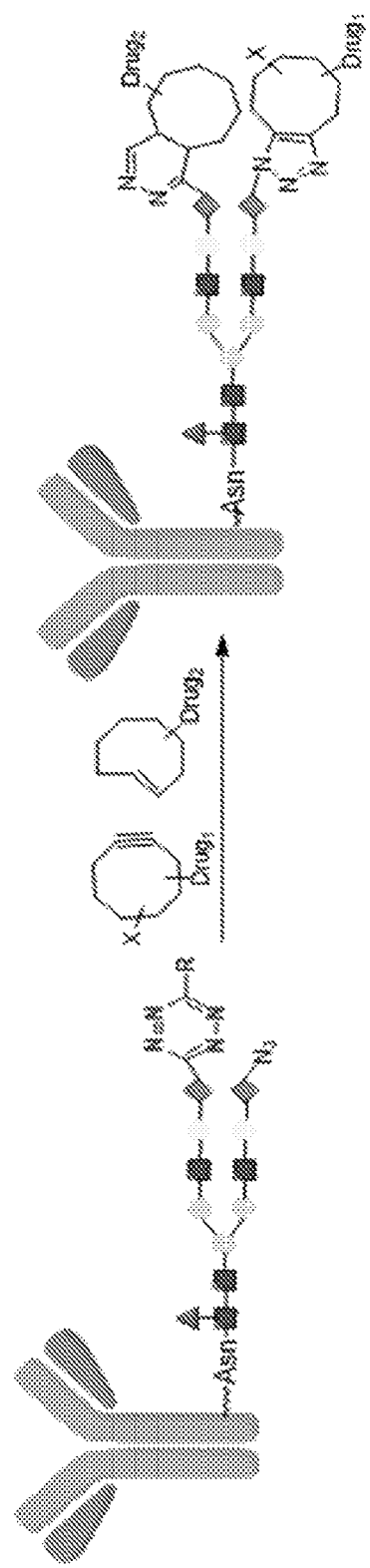

FIG. 5A depicts a sequential glycosylation process to install azide and tetrazine-modified sialosides into a glycan. FIG. 5B depicts the specific sialoside donors. FIG. 5C depicts the orthogonal conjugation reactions.

DETAILED DESCRIPTION

Before the present methods and systems are disclosed and described, it is to be understood that the methods and systems are not limited to specific synthetic methods, specific components, or to particular compositions. It is also to be understood that the terminology used herein is for the purpose of describing particular embodiments only and is not intended to be limiting.

As used in the specification and the appended claims, the singular forms "a," "an" and "the" include plural referents unless the context clearly dictates otherwise. Ranges may be expressed herein as from "about" one particular value, and/or to "about" another particular value. When such a range is expressed, another embodiment includes¬ from the one particular value and/or to the other particular value. Similarly, when values are expressed as approximations, by use of the antecedent "about," it will be understood that the particular value forms another embodiment. It will be further understood that the endpoints of each of the ranges are significant both in relation to the other endpoint, and independently of the other endpoint.

"Optional" or "optionally" means that the subsequently described event or circumstance may or may not occur, and that the description includes instances where said event or circumstance occurs and instances where it does not.

Throughout the description and claims of this specification, the word "comprise" and variations of the word, such as "comprising" and "comprises," means "including but not limited to," and is not intended to exclude, for example, other additives, components, integers or steps. "Exemplary" means "an example of" and is not intended to convey an indication of a preferred or ideal embodiment. "Such as" is not used in a restrictive sense, but for explanatory purposes.

Disclosed are components that can be used to perform the disclosed methods and systems. These and other components are disclosed herein, and it is understood that when combinations, subsets, interactions, groups, etc. of these components are disclosed that while specific reference of each various individual and collective combinations and permutation of these may not be explicitly disclosed, each is specifically contemplated and described herein, for all methods and systems. This applies to all aspects of this application including, but not limited to, steps in disclosed methods.

Thus, if there are a variety of additional steps that can be performed it is understood that each of these additional steps can be performed with any specific embodiment or combination of embodiments of the disclosed methods.

The term "alkyl" as used herein is a branched or unbranched hydrocarbon group such as methyl, ethyl, n-propyl, isopropyl, n-butyl, isobutyl, t-butyl, pentyl, hexyl, heptyl, octyl, nonyl, decyl, dodecyl, and the like. The alkyl group can also be substituted or unsubstituted. Unless stated otherwise, the term "alkyl" contemplates both substituted and unsubstituted alkyl groups. The alkyl group can be substituted with one or more groups including, but not limited to, alkoxy, alkenyl, alkynyl, cycloalkyl, heterocycloalkyl, aryl, heteroaryl, aldehyde, amino, carboxylic acid, ester, ether, halide, hydroxy, ketone, nitro, silyl, sulfo-oxo, or thiol. An alkyl group which contains no double or triple carbon-carbon bonds is designated a saturated alkyl group, whereas an alkyl group having one or more such bonds is designated an unsaturated alkyl group. Unsaturated alkyl groups having a double bond can be designated alkenyl groups, and unsaturated alkyl groups having a triple bond can be designated alkynyl groups. Unless specified to the contrary, the term alkyl embraces both saturated and unsaturated groups.

The term "cycloalkyl" as used herein is a non-aromatic carbon-based ring composed of at least three carbon atoms. Examples of cycloalkyl groups include, but are not limited to, cyclopropyl, cyclobutyl, cyclopentyl, cyclohexyl, etc. The term "heterocycloalkyl" is a cycloalkyl group as defined above where at least one of the carbon atoms of the ring is replaced with a heteroatom such as, but not limited to, nitrogen, oxygen, sulfur, selenium or phosphorus. The cycloalkyl group and heterocycloalkyl group can be substituted or unsubstituted. Unless stated otherwise, the terms "cycloalkyl" and "heterocycloalkyl" contemplate both substituted and unsubstituted cyloalkyl and heterocycloalkyl groups. The cycloalkyl group and heterocycloalkyl group can be substituted with one or more groups including, but not limited to, alkyl, alkoxy, alkenyl, alkynyl, cycloalkyl, heterocycloalkyl, aryl, heteroaryl, aldehyde, amino, carboxylic acid, ester, ether, halide, hydroxy, ketone, nitro, silyl, sulfo-oxo, or thiol. A cycloalkyl group which contains no double or triple carbon-carbon bonds is designated a saturated cycloalkyl group, whereas a cycloalkyl group having one or more such bonds (yet is still not aromatic) is designated an unsaturated cycloalkyl group. Unless specified to the contrary, the term cycloalkyl embraces both saturated and unsaturated, non-aromatic, ring systems.

The term "aryl" as used herein is an aromatic ring composed of carbon atoms. Examples of aryl groups include, but are not limited to, phenyl and naphthyl, etc. The term "heteroaryl" is an aryl group as defined above where at least one of the carbon atoms of the ring is replaced with a heteroatom such as, but not limited to, nitrogen, oxygen, sulfur, selenium or phosphorus. The aryl group and heteroaryl group can be substituted or unsubstituted. Unless stated otherwise, the terms "aryl" and "heteroaryl" contemplate both substituted and unsubstituted aryl and heteroaryl groups. The aryl group and heteroaryl group can be substituted with one or more groups including, but not limited to, alkyl, alkoxy, alkenyl, alkynyl, cycloalkyl, heterocycloalkyl, aryl, heteroaryl, aldehyde, amino, carboxylic acid, ester, ether, halide, hydroxy, ketone, nitro, silyl, sulfo-oxo, or thiol.

Exemplary heteroaryl and heterocyclyl rings include: benzimidazolyl, benzofuranyl, benzothiofuranyl, benzothiophenyl, benzoxazolyl, benzoxazolinyl, benzthiazolyl, benztriazolyl, benztetrazolyl, benzisoxazolyl, benzisothiazolyl, benzimidazolinyl, carbazolyl, 4aH carbazolyl, carbolinyl, chromanyl, chromenyL cirrnolinyl, decahydroquinolinyl, 2H,6H~1,5,2-dithiazinyl, dihydrofuro[2,3 b]tetrahydrofuran, furanyl, furazanyl, imidazolidinyl, imidazolinyl, imidazolyl, 1H-indazolyl, indolenyl, indolinyl, indolizinyl, indolyl, 3H-indolyl, isatinoyl, isobenzofuranyl, isochromanyl, isoindazolyl, isoindolinyl, isoindolyl, isoquinolinyl, isothiazolyl, isoxazolyl, methylenedioxyphenyl, morpholinyl, naphthyridinyl, octahydroisoquinolinyl, oxadiazolyl, 1,2,3-oxadiazolyl, 1,2,4-oxadiazolyl, 1,2,5-oxadiazolyl, 1,3,4-oxadiazolyl, oxazolidinyl, oxazolyl, oxindolyl, pyrimidinyl, phenanthridinyl, phenanthrolinyl, phenazinyl, phenothiazinyl, phenoxathinyl, phenoxazinyl, phthalazinyl, piperazinyl, piperidinyl, piperidonyl, 4-piperidonyl, piperonyl, pteridinyl, purinyl, pyranyl, pyrazinyl, pyrazolidinyl, pyrazolinyl, pyrazolyl, pyridazinyl, pyridooxazole, pyridoimidazole, pyridothiazole, pyridinyl, pyridyl, pyrimidinyl, pyrrolidinyl, pyrrolinyl, 2H-pyrrolyl, pyrrolyl, quinazolinyl, quinolinyl, 4H-quinolizinyl, quinoxalinyl, quinuclidinyl, tetrahydrofuranyl, tetrahydroisoquinolinyl, tetrahydroquinolinyl, tetrazolyl, 6H-1,2,5-thiadiazinyl, 1,2,3-thiadiazolyl, 1,2,4-thiadiazolyl, 1,2,5-thiadiazolyl, 1,3,4-thiadiazolyl, thianthrenyl, thiazolyl, thienyl, thienothiazolyl, thienooxazolyl, thienoimidazolyl, thiophenyl, and xanthenyl.

The terms "alkoxy," "cycloalkoxy," "heterocycloalkoxy," "cycloalkoxy," "aryloxy," and "heteroaryloxy" have the aforementioned meanings for alkyl, cycloalkyl, heterocycloalkyl, aryl and heteroaryl, further providing said group is connected via an oxygen atom.

As used herein, the term "substituted" is contemplated to include all permissible substituents of organic compounds. In a broad aspect, the permissible substituents include acyclic and cyclic, branched and unbranched, carbocyclic and heterocyclic, and aromatic and nonaromatic substituents of organic compounds. Illustrative substituents include, for example, those described below. The permissible substituents can be one or more and the same or different for appropriate organic compounds. For purposes of this disclosure, the heteroatoms, such as nitrogen, can have hydrogen substituents and/or any permissible substituents of organic compounds described herein which satisfy the valencies of the heteroatoms. This disclosure is not intended to be limited in any manner by the permissible substituents of organic compounds. Also, the terms "substitution" or "substituted with" include the implicit proviso that such substitution is in accordance with permitted valence of the substituted atom and the substituent, and that the substitution results in a stable compound, e.g., a compound that does not spontaneously undergo transformation such as by rearrangement, cyclization, elimination, etc. Unless specifically stated, a substituent that is said to be "substituted" is meant that the substituent can be substituted with one or more of the following: alkyl, alkoxy, alkenyl, alkynyl, cycloalkyl, heterocycloalkyl, aryl, heteroaryl, aldehyde, amino, carboxylic acid, ester, ether, halide, hydroxy, ketone, nitro, silyl, sulfo-oxo, or thiol. In a specific example, groups that are said to be substituted are substituted with a protic group, which is a group that can be protonated or deprotonated, depending on the pH.

Unless specified otherwise, the term "patient" refers to any mammalian animal, including but not limited to, humans Disclosed herein are functionalized antibody having an N-linked oligosaccharide conjugated to a first and second cargo moiety. In preferred embodiments, the first and second cargo moieties will be present in a substantially 1:1 ratio. In other embodiments, one of the cargo moieties can be present in a greater (molar) amount than the other. For instance, the first cargo moiety can be present in greater amount, or the second cargo moieties can be present in greater amount. In some embodiments, the molar ratio of the (a) first cargo moiety to (b) second cargo moiety can be approximately 4:1, 3:1, 2:1, 1:1, 1:2, 1:3, or 1:4.

Antibody

The functionalized antibody of the invention may be a monoclonal or a polyclonal antibody. In a preferred embodiment, the functionalized antibody is a monoclonal antibody. In one aspect of the invention, the functionalized antibody recognizes a target antigen. In a preferred embodiment, the target antigen is a tumor antigen and is localized to a tumor cell's surface. In a further embodiment, the functionalized antibody bound to the target antigen can be internalized after binding to the tumor cell. Where the functionalized antibody is conjugated to one or more cargo molecules, the cargo molecules can be released into the cell after internalization. For example, when the functionalized antibody is linked to a cytotoxic drug, the cytotoxic drug can be released into the cell after internalization, resulting in cell death. Preferably, the target antigen displays differential expression between normal cells and tumor cells, displaying increased expression on tumor cells. The target antigen can be a B cell antigen, for example CD19, CD20, CD21, CD22, CD79, or CD180, or a fragment thereof. The target antigen can be a protein elevated in certain types of cancers or a tumor marker, for example Her2, Muc16, M1S1, prostate-specific membrane antigen (PSMA) or CD30, or a fragment thereof. The target antigen could alternatively be Glycoprotein NMB, CD33, CD56, CD66e/CEACAMS, CD74, CD79b, CD138, CA-IX, SLC44A4, Mesothelin, or Nectin-4, or a fragment thereof. The target antigen could be a tissue-specific marker or a glycan, or a fragment thereof. In one embodiment, the functionalized antibody binds to the target antigen with high affinity. In a preferred embodiment, the affinity of the functionalized antibody will be at least about 5-fold, preferably-10 fold, more preferably 25-fold, even more preferably 50-fold, and most preferably 100-fold or more, greater for a target molecule than its affinity for a non-target molecule.

The functionalized antibody or functionalized antibody fragment can be of any class, such as an IgM, IgA, IgD, IgE, or IgG class, or subclass of immunoglobulin molecule. In a preferred embodiment, the functionalized antibody or functionalized antibody fragment is of the IgG class. The functionalized antibody or functionalized antibody fragment can be from the IgG1, IgG2, IgG3, and/or IgG4 subclasses. In a preferred embodiment, the functionalized antibody or functionalized antibody fragment is from the IgG1 subclass. In a preferred embodiment, the functionalized antibody or functionalized antibody fragment has a conserved Asparagine at position 297 of the heavy chain as defined by the Kabat numbering system (Kabat et al., Sequences of Proteins of Immunological Interest, Vol. 1, 5th Ed. U.S. Public Health Service, National Institutes of Health. NIH Publication No. 91-3242; Copyright 1991).

The functionalized antibody or functionalized antibody fragment may be derived from a human, a mouse, a rat, or another mammal. The functionalized antibody or functionalized antibody fragment may also be a hybridization of antibodies from human, mouse, rat, and/or other mammals. In a preferred embodiment, the functionalized antibody or functionalized antibody fragment is derived from a human. The functionalized antibody or functionalized antibody fragment may be produced by hybridoma cells or cell lines. The functionalized antibody or functionalized antibody fragment may be humanized.

The functionalized antibody may be a monoclonal antibody. For instance, the monoclonal antibody can be abagovomab, abciximab, abituzumab, abrezekimab, abrilumab, actoxumab, adalimumab, adecatumumab, aducanumab, afasevikumab, afelimomab, alacizumab pegol, alemtuzumab, alirocumab, altumomab pentetate, amatuximab, anatumomab mafenatox, andecaliximab, anetumab ravtansine, anifrolumab, anrukinzumab, apolizumab, aprutumab ixadotin, arcitumomab, ascrinvacumab, aselizumab, atezolizumab, atidortoxumab, atinumab, atorolimumab, avelumab, azintuxizumab vedotin, bapineuzumab, basiliximab, bavituximab, BCD-100, bectumomab, begelomab, belantamab mafodotin, belimumab, bemarituzumab, benralizuma, fasenramab, berlimatoxumab, bermekimab, bersanlimab, bertilimumab, besilesomab, bevacizumab, bezlotoxumab, biciromab, bimagrumab, bimekizumab, birtamimab, bivatuzumab mertansine, bleselumab, blinatumomab, blontuvetmab, blosozumab, bococizumab, brazikumab, brentuximab vedotin, briakinumab, brodalumab, brolucizumab, brontictuzumab, burosumab, crysvitamab, cabiralizumab, camidanlumab tesirine, camrelizumab, canakinumab, cantuzumab mertansine, cantuzumab ravtansine, caplacizumab, capromab pendetide, carlumab, carotuximab, catumaxomab, CBR96-doxorubicin immunoconjugate, cedelizumab, cemiplimab, cergutuzumab amunaleukin, certolizumab pegol, cetrelimab, cetuximab, cibisatamab, cirmtuzumab, citatuzumab bogatox, cixutumumab, clazakizumab, clenoliximab, clivatuzumab tetraxetan, codrituzumab, cofetuzumab pelidotin, coltuximab ravtansine, conatumumab, concizumab, cosfroviximab, CR6261, crenezumab, crizanlizumab, crotedumab, cusatuzumab, dacetuzumab, daclizumab, dalotuzumab, dapirolizumab pegol, daratumumab, dectrekumab, demcizumab, denintuzumab mafodotin, denosumab, depatuxizumab mafodotin, derlotuximab biotin, detumomab, dezamizumab, dinutuximab, diridavumab, domagrozumab, dorlimomab aritox, dostarlimab, drozitumab, ds-8201, duligotuzumab, dupilumab, durvalumab, dusigitumab, duvortuxizumab, ecromeximab, eculizumab, edobacomab, edrecolomab, efalizumab, efungumab, eldelumab, elezanumab, elgemtumab, elotuzumab, elsilimomab, emactuzumab, emapalumab, emibetuzumab, emicizumab, hemlibra, enapotamab vedotin, enavatuzumab, enfortumab vedotin, enlimomab pegol, enoblituzumab, enokizumab, enoticumab, ensituximab, epitumomab cituxetan, epratuzumab, eptinezumab, erenumab, erlizumab, ertumaxomab, etaracizumab, etigilimab, etrolizumab, evinacumab, evolocumab, exbivirumab, fanolesomab, faralimomab, faricimab, farletuzumab, fasinumab, fbta05, felvizumab, fezakinumab, fibatuzumab, ficlatuzumab, figitumumab, firivumab, flanvotumab, fletikumab, flotetuzumab, fontolizumab, foralumab, foravirumab, fremanezumab, fresolimumab, frovocimab, frunevetmab, fulranumab, futuximab, galcanezumab, galiximab, gancotamab, ganitumab, gantenerumab, gatipotuzumab, gavilimomab, gedivumab, gemtuzumab ozogamicin, gevokizumab, gilvetmab, gimsilumab, girentuximab, glembatumumab vedotin, golimumab, gomiliximab, gosuranemab, guselkumab, ianalumab, ibalizumab, IBI308, ibritumomab tiuxetan, icrucumab, idarucizumab, ifabotuzumab, igovomab, iladatuzumab vedotin, IMAB362, imalumab, imaprelimab, imciromab, imgatuzumab, inclacumab, indatuximab ravtansine, indusatumab vedotin, inebilizumab, infliximab, inolimomab, inotuzumab ozogamicin, intetumumab, IOMAB-B, ipilimumab, iratumumab, isatuximab, iscalimab, istiratumab, itolizumab, ixekizumab, keliximab, labetuzumab, lacnotuzumab, ladiratuzumab vedotin, lampalizumab, lanadelumab, landogrozumab, laprituximab emtansine, larcaviximab, lebrikizumab, lemalesomab, lendalizumab, lenvervimab, lenzilumab, lerdelimumab, leronlimab, lesofavumab, letolizumab, lexatumumab, libivirumab, lifastuzumab vedotin, ligelizumab, lilotomab satetraxetan, lintuzumab, lirilumab, lodelcizumab, lokivetmab, loncastuximab tesirine, lorvotuzumab mertansine, losatuxizumab vedotin, lucatumumab, lulizumab pegol, lumiliximab, lumretuzumab, lupartumab amadotin, lutikizumab, mapatumumab, margetuximab, marstacimab, maslimomab, matuzumab, mavrilimumab, mepolizumab, metelimumab, milatuzumab, minretumomab, mirikizumab, mirvetuximab soravtansine, mitumomab, modotuximab, mogamulizumab, monalizumab, morolimumab, mosunetuzumab, motavizumab, moxetumomab pasudotox, muromonab-CD3, nacolomab tafenatox, namilumab, naptumomab estafenatox, naratuximab emtansine, narnatumab, natalizumab, navicixizumab, navivumab, naxitamab, nebacumab, necitumumab, nemolizumab, NEOD001, nerelimomab, nesvacumab, netakimab, nimotuzumab, nirsevimab, nivolumab, nofetumomab merpentan, obiltoxaximab, obinutuzumab, ocaratuzumab, ocrelizumab, odulimomab, ofatumumab, olaratumab, oleclumab, olendalizumab, olokizumab, omalizumab, omburtamab, OMS721, onartuzumab, ontuxizumab, onvatilimab, opicinumab, oportuzumab monatox, oregovomab, orticumab, otelixizumab, otilimab, otlertuzumab, oxelumab, ozanezumab, ozoralizumab, pagibaximab, palivizumab, pamrevlumab, panitumumab, pankomab, panobacumab, parsatuzumab, pascolizumab, pasotuxizumab, pateclizumab, patritumab, PDR001, pembrolizumab, pemtumomab, perakizumab, pertuzumab, pexelizumab, pidilizumab, pinatuzumab vedotin, pintumomab, placulumab, plozalizumab, pogalizumab, polatuzumab vedotin, ponezumab, porgaviximab, prasinezumab, prezalizumab, priliximab, pritoxaximab, pritumumab, PRO 140, quilizumab, racotumomab, radretumab, rafivirumab, ralpancizumab, ramucirumab, ranevetmab, ranibizumab lucentis, ravagalimab, ravulizumab, raxibacumab, refanezumab, regavirumab, relatlimab, remtolumab, reslizumab, rilotumumab, rinucumab, risankizumab, rituximab, rivabazumab pegol, RMAb rabishield, robatumumab, roledumab, romilkimab, romosozumab, rontalizumab, rosmantuzumab, rovalpituzumab tesirine, rovelizumab, rozanolixizumab, ruplizumab, SA237, sacituzumab govitecan, samalizumab, samrotamab vedotin, sarilumab, satralizumab, satumomab pendetide, secukinumab, selicrelumab, seribantumab, setoxaximab, setrusumab, sevirumab, SGN-CD19a, SHP647, sibrotuzumab, sifalimumab, siltuximab, simtuzumab, siplizumab sirtratumab vedotin, sirukumab, sofituzumab vedotin, solanezumab, solitomab, sonepcizumab, sontuzumab, spartalizumab, stamulumab sulesomab, suptavumab, sutimlimab, suvizumab, suvratoxumab, tabalumab, tacatuzumab tetraxetan, tadocizumab, talacotuzumab, talizumab, tamtuvetmab, tanezumab, taplitumomab paptox, tarextumab, tavolimab, tefibazumab, telimomab aritox, telisotuzumab vedotin, tenatumomab, teneliximab, teplizumab, tepoditamab, teprotumumab, tesidolumab, tetulomab, tezepelumab, TGN1412, tibulizumab, tigatuzumab, tildrakizumab, timigutuzumab, timolumab, tiragotumab, tislelizumab, tisotumab vedotin, TNX-650, tocilizumab, tomuzotuximab, toralizumab, tosatoxumab, tositumomab, tovetumab, tralokinumab, trastuzumab, trastuzumab emtansine, TRBS07, tregalizumab, tremelimumab, trevogrumab, tucotuzumab celmoleukin, tuvirumab, ublituximab, ulocuplumab, urelumab, urtoxazumab, ustekinumab, utomilumab, vadastuximab talirine, vanalimabmab, vandortuzumab vedotin, vantictumab, vanucizumab, vapaliximab, varisacumab, varlilumab, vatelizumab, vedolizumab, entyvio, veltuzumab, vepalimomab, vesencumab, visilizumab, vobarilizumab, volociximab, vonlerolizumab, vopratelimab, vorsetuzumab mafodotin, votumumab, vunakizumab, xentuzumab, XMAB-5574, zalutumumab, zanolimumab, zatuximab, zenocutuzumab, ziralimumab, zolbetuximab, zolimomab aritox, or ponezumab.

Antibodies suitable for post-translational functionalization according to the invention can be generated by a suitable method known in the art. For example, monoclonal antibodies can be prepared using a wide variety of techniques including, for example, the use of hybridoma, recombinant, and phage display technologies, or a combination thereof. Any technique which provides for the production of antibody molecule by continuous cell lines in culture may be used. For example, the hybridoma technique originally developed by Kohler and Milstein (256 Nature 495-497 (1975)) may be used. See also Asubel et al., Antibodies: a Laboratory Manual (Harlow & Lane eds., Cold Spring Harbor Lab. 1988); Current Protocols in Immunology (Colligan et al., eds., Greene Pub. Assoc. & Wiley Interscience 30 N.Y., 1992-1996).

Antibodies can be elicited in an animal host by immunization with a target antigen, or can be formed by in vitro immunization of immune cells. The antibodies can also be produced in recombinant systems in which the appropriate cell lines are transformed, transfected, infected or transduced with appropriate antibody-encoding DNA. Alternatively, the antibodies can be constructed by biochemical reconstitution of purified heavy and light chains.

In a preferred embodiment, the antibodies are human antibodies. Human antibodies can be made by a variety of methods known in the art including, for example, phage display methods using antibody libraries derived from human immunoglobulin sequences. In addition, commercial antibodies may be used to generate the antibodies of the invention. The antibody may be generated in humans, mice, or other mammals or mammalian systems using conventional means.

Once an antibody or antibody fragment has been produced by an animal, chemically synthesized, or recombinantly expressed, it may be purified by any method known in the art for purification of an immunoglobulin molecule, for example, by chromatography (e.g., ion exchange, affinity, particularly by affinity for the specific antigen after Protein A, and sizing column chromatography), centrifugation, differential solubility, or by any other standard technique for the purification of proteins. In addition, the antibodies of the present invention or fragments thereof can be fused to heterologous polypeptide sequences known in the art to facilitate purification.

Cargo Moieties

Suitable cargo moieties that can be advantageously conjugated with the antibody include therapeutic agents and diagnostic agents, e.g., radionuclides, fluorophores, dyes, and the like. Suitable therapeutic agents include cytotoxic agents, antibiotics, immunosuppressants, and various biopolymers such as therapeutic proteins, vaccines, nucleic acids, and the like.

In some embodiments, the first cargo moiety includes one or more anti-cancer agents. Exemplary classes of anti-cancer agents include topoisomerase inhibitors, mitotic inhibitors, antimetabolites such as antifolates, pyrimidine antagonists, purine analogs, purine antagonists, ribonucleotide reductase inhibitors, proteasome inhibitors, tyrosine kinase inhibitors, and alkylating agents like pyrrolobenzodiazepines, oxazaphosphorines, nitrogen mustards, hydrazines, and platinum-based agents. In certain embodiments, the chemotherapeutic is which is a P-gp-potentiated MDR selective compound, meaning that resistance to the drug via overexpression of P-gp or other pathway is known.

In some instances, the second cargo moiety can be an anti-cancer agent as defined above. In other embodiments, the second cargo moiety can include an agent to increase the therapeutic effectiveness of the first cargo moiety. For instance, the second cargo moiety can be an ABC transport modulator, a DNA methylation inhibitor, a P-glycoprotein inhibitor, or an immune modulator.

N-Linked Oligosaccharide

The N-linked oligosaccharide can be connected to the antibody via a pendant nitrogen present in an amino acid side chain, for instance an asparagine, arginine, glutamine, or lysine. Preferably, the N-linked oligosaccharide is connected through an asparagine, for instance the Asp297 position of the Fc domain. The N-linked oligosaccharide can include at least one branch, wherein one arm of the branch is conjugated to the first cargo moiety, and the second arm of the branch is conjugated to the second cargo moiety.

In certain embodiments, the branches of the N-linked oligosaccharide can include functionalized sialosides conjugated to cargo moieties. Preferably, a branch of the N-linked oligosaccharide can include a terminal sialoside, meaning that the functionalized sialoside is at the end of saccharide chain. The terminal sialoside can have the formula:

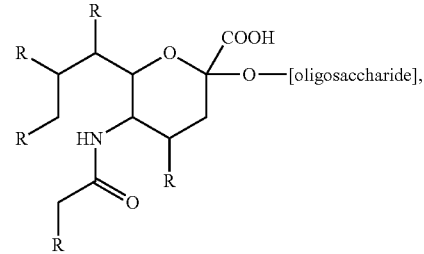

wherein R is independently selected from H, OH, or *-L-A, wherein L is null, cleavable linker, or non-cleavable linker, A is the cargo moiety, and * represents the site of attachment to the sialoside. In certain embodiments, the terminal sialoside can have the formula:

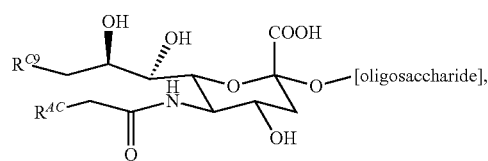

wherein $R^{C9}$ is hydroxyl or *-L-A, and $R^{AC}$ is hydrogen or *-L-A, provided at least one *-L-A group is present.

Suitable branched N-linked oligosaccharides include those with the G2 glycoform, with or without bisecting GlnNAc. In such cases, the C-3 arm of the G2 glycoform is conjugated to the first cargo moiety, and the C-6 arm of the G2 glycoform is conjugated to the second cargo moiety. In some embodiments, the N-linked oligosaccharide can have the formula:

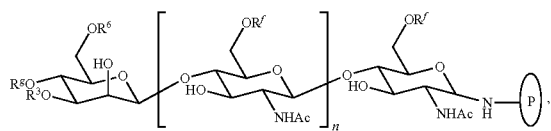

wherein P represents a protein, $R^f$ is independently selected from hydrogen or fucose, n is 0 or 1, $R^g$ is selected from hydrogen or GlcNAc, $R^3$ represents the C-3 arm, and $R^6$ represents the C-6 arm. In some instances, $R^g$ can have the formula:

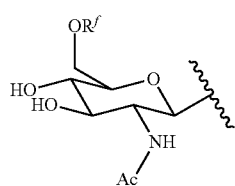

The C-3 arm of the N-linked oligosaccharide can include a terminal sialoside (as defined above) conjugated to one or more first cargo moieties. The terminal sialoside can have the formula:

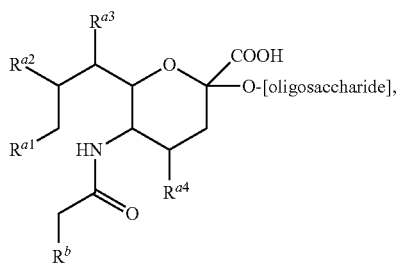

wherein $R^{a1}$, $R^{a2}$, $R^{a3}$, and $R^{a4}$ are independently selected from —OH or *-$L^1$-$(A^1)_a$, and $R^b$ is independently selected from —H or *-$L^1$-$(A^1)_a$, wherein $L^1$ represents a first linker, $A^1$ represents a first cargo compound, and a is 1 or 2, provided at least one *-$L^1$-$(A^1)_a$ group is present. In some embodiment, the terminal sialoside can have the formula:

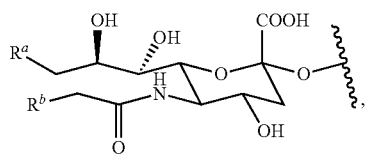

wherein $R^a$ is independently selected from —OH or *-$L^1$-$(A^1)_a$, and $R^b$ is independently selected from —H or *-$L^1$-$(A^1)_a$, wherein $L^1$ represents a first linker, $A^1$ represents a first cargo compound, and a is 1 or 2, provided at least one *-$L^1$-$(A^1)_a$ group is present.

In some embodiments, $R^3$ can be an oligosaccharide having the formula:

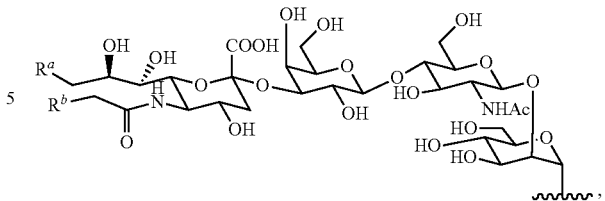

wherein $R^a$ and $R^b$ are as defined above.

The C-6 arm of the oligosaccharide of the N-linked oligosaccharide can include a terminal sialoside (as defined above) conjugated to one or more second cargo moieties. The terminal sialoside can have the formula:

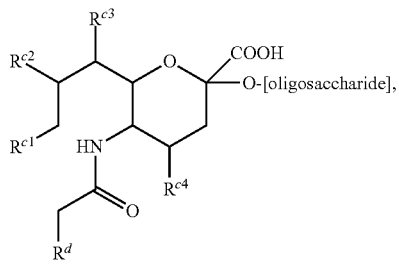

wherein $R^{c1}$, $R^{c2}$, $R^{c3}$, and $R^{c4}$ are independently selected from —OH or *-$L^2$-$(A^2)_a$, and $R^d$ is independently selected from —H or *-$L^2$ $(A^2)_b$, wherein $L^2$ represents a second linker, $A^2$ represents a second cargo compound, and b is 1 or 2, provided at least one *-$L^2$-$(A^2)_b$ group is present. In some cases, the C-6 arm can include a terminal sialic acid moiety having the formula:

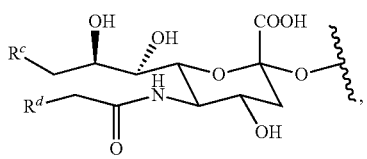

wherein $R^c$ is independently selected from —OH or *-$L^2$-$(A^2)_b$, and $R^d$ is independently selected from —H or *-$L^2$-$(A^2)_b$, wherein $L^2$ represents a second linker, $A^2$ represents a second cargo compound, and b is 1 or 2, provided at least one *-$L^2$-$(A^2)_b$ group is present.

In some embodiments, $R^6$ can be an oligosaccharide having the formula:

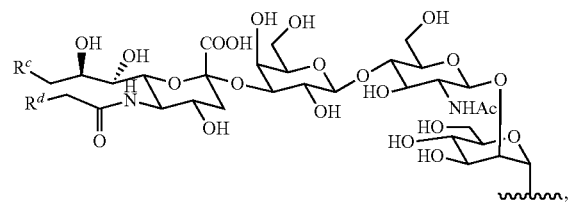

wherein $R^c$ and $R^d$ are as defined above.

In certain embodiments, $L^1$ can include 1,2,3-triazole or 1,2-diazine:

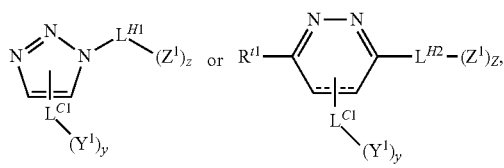

wherein one of $Z^1$ and $Y^1$ represents $A^1$ and the other represents the terminal sialoside, wherein when $Z^1$ is $A^1$, then z is 1 or 2, and y is 1, and when $Y^1$ is $A^1$, then z is 1, and y is 1 or 2; $R^{t1}$ represents hydrogen, $C_{1-8}$alkyl, $C_{1-8}$alkoxy, aryl, $C_{1-8}$heteroaryl, $C_{3-8}$cycloalkyl, $C_{1-8}$heterocyclyl, or, when $Z^1$ is $A^1$, another *-$L^{H1}$-$(Z^1)_z$ group; and $L^{H1}$ and $L^{C1}$ are each independently selected from null, cleavable linker, and non-cleavable linker. As used herein, a bond that does not termination at a specific carbon, but instead into a ring system indicates the bond can be located at any atom on the ring so long as valence is satisfied. For instance, the triazole can be a 1,2 triazole:

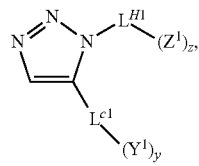

or a 1,4 triazole:

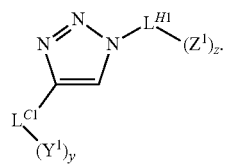

In certain embodiments, $L^1$ can include 1,2,3-triazole or 1,2-diazine optionally fused to a 7, 8, 9, or 10 membered, optionally substituted, ring. Exemplary optional substituents include halogen, carbonyl, and fused aryl. In some instances, $L^1$ can include 1,2,3-triazole or 1,2-diazine fused to an 8 membered ring:

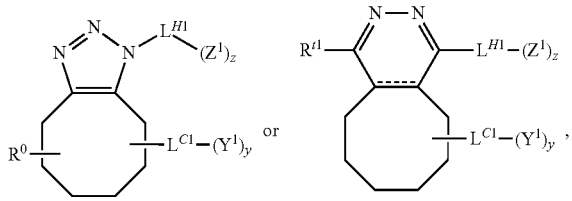

wherein $Z^1$ $Y^1$ z, y, $L^{C1}$, $L^{H1}$, and $R^{t1}$ are as defined above. Any of the atoms defining the ring may be a carbon or heteroatom. Although not expressly depicted above, any atom in the ring may be substituted one or more times.

In certain embodiments, $R^a$ and $R^b$ can independently be a *-$L^1$-$(A^1)_a$ group having the formula:

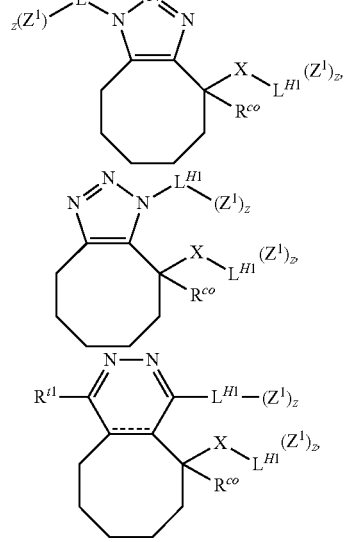

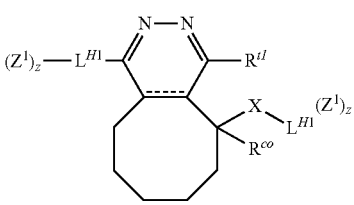

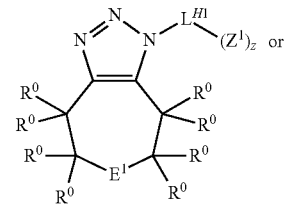

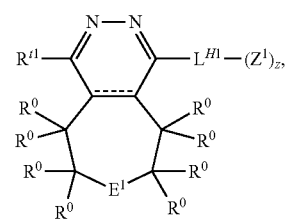

wherein, $R^{co}$ is hydrogen or halogen, e.g., F, Cl, Br, or I;

X is null or O;

$R^0$ is in each case independently selected from hydrogen, halogen, $C_{1-8}$alkyl, $C_{1-8}$alkoxy, aryl, $C_{1-8}$heteroaryl, $C_{3-8}$cycloalkyl, or $C_{1-8}$heterocyclyl; wherein any two or more $R^0$ groups can together form a ring;

$E^1$ is selected from:

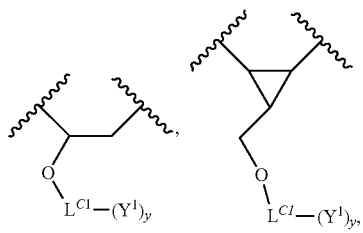

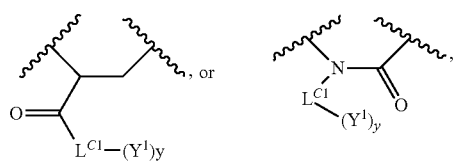

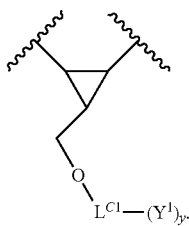

and $Z^1$, $Y^1$, z, y, $R^{t1}$, $L^{H1}$, and $L^{C1}$ are as defined above.

In further embodiments, $R^a$ can be a *-$L^1$-$(A^1)_2$ group and $R^b$ can be a *-$L^1$-$A^1$ group, while in other embodiments, $R^a$ can be a *-$L^1$-$A^1$ group and $R^b$ can be a *-$L^1$-$(A^1)_2$ group.

In certain preferred embodiments, $L^{H1}$ is null and $Z^1$ is the terminal sialoside. Further embodiments include those in which $L^{C1}$ is a linker and $Y^1$ is $A^1$.

Cleavable linkers for $L^{H1}$ and $L^{C1}$ groups can include one or more hydrazone or other acid-sensitive groups, capthesin B-responsive groups, β-glucuronidase-responsive groups, disulfide groups, or pyrophosphate diester groups.

In some instances, the *-$L^1$-$A^1$ group can have the formula:

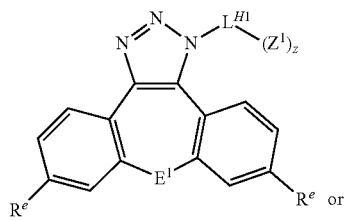

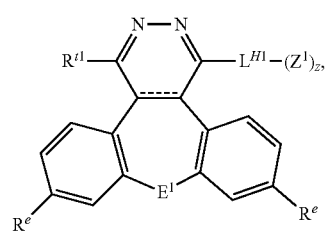

wherein $L^{H1}$, $Z^1$, z and $E^1$ are as defined above, and Re is selected from hydrogen, or either *—$OSO_3X^1$ or *—$OPO_3X^1$, wherein $X^1$ is selected from H, $C_{1-8}$alkyl, or a pharmaceutically acceptable cation. In other embodiments, each $R^0$ is hydrogen and $E^1$ is:

In certain embodiments, $L^2$ can include 1,2,3-triazole (1,2 or 1,4 isomer) or 1,2-diazine:

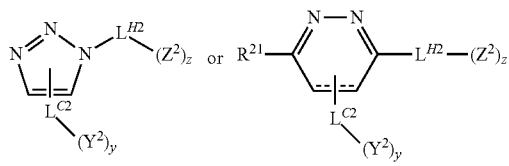

wherein one of $Z^2$ and $Y^2$ represents $A^2$ and the other represents the terminal sialoside, wherein when $Z^2$ is $A^2$, then z is 1 or 2, and y is 1, and when $Y^2$ is $A^2$, then z is 1, and y is 1 or 2; $R^{t2}$ represents hydrogen, $C_{1-8}$alkyl, $C_{1-8}$alkoxy, aryl, $C_{1-8}$heteroaryl, $C_{3-8}$cycloalkyl, $C_{1-8}$heterocyclyl, or, when $Z^2$ is $A^2$, another *-$L^{H2}$-$(Z^2)_z$ group; and $L^{H2}$ and $L^{C2}$ are each independently selected from null, cleavable linker, and non-cleavable linker. In certain embodiments, $L^2$ can include 1,2,3-triazole or 1,2-diazine optionally fused to a 7, 8, 9, or 10 membered, optionally substituted, ring. Exemplary optional substituents include halogen and fused aryl. In some instances, $L^2$ can include 1,2,3-triazole or 1,2-diazine fused to an 8 membered ring:

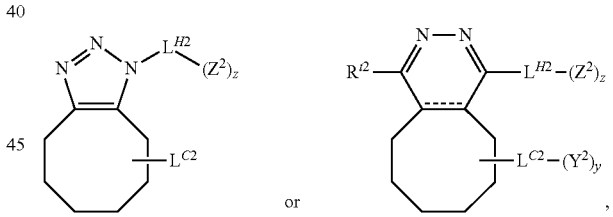

wherein $Z^2$, $Y^2$, z, y, $R^{t2}$, $L^{H2}$ and $L^{C2}$ are as defined above. The carbocyclic ring, either in the 8 membered rings depicted above, or in other sized rings, may be further substituted one or more times as defined herein.

In certain embodiments, $R^c$ and $R^d$ can independently be a *-$L^2$-$(A^2)_a$ group having the formula:

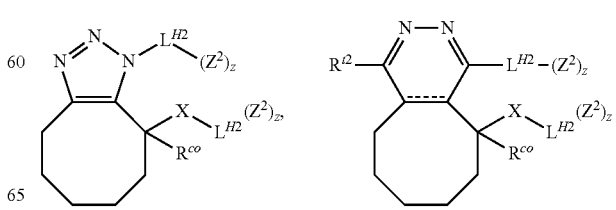

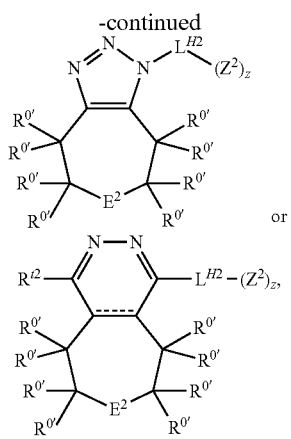

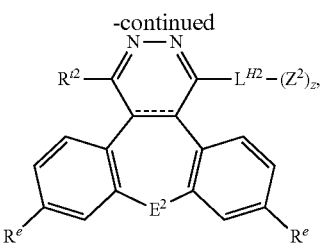

wherein $L^{H2}$, $Z^2$, z and $E^2$ are as defined above, and Re is selected from hydrogen, *—$OSO_3X^1$ or *—$OPO_3X^1$, wherein $X^1$ is selected from H, $C_{1-8}$alkyl, or a pharmaceutically acceptable cation. In other embodiments, each $R^0$ is hydrogen and $E^2$ is:

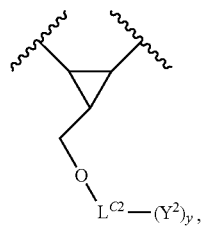

wherein,
$R^{co}$ is hydrogen or halogen, e.g., F, Cl, Br, or I;
X is null or O;
$R^0$ is in each case independently selected from hydrogen, halogen, $C_{1-8}$alkyl, $C_{1-8}$alkoxy, aryl, $C_{1-8}$heteroaryl, $C_{3-8}$cycloalkyl, or $C_{1-8}$heterocyclyl; wherein any two or more $R^0$ groups can together form a ring;
$E^2$ is selected from:

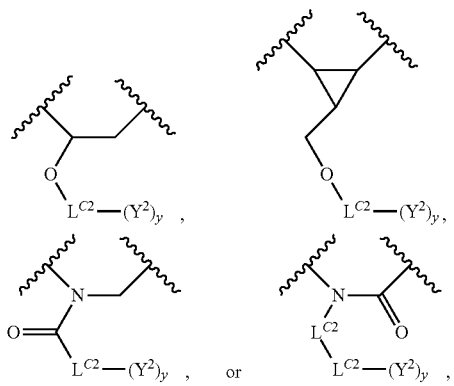

and and $Z^2$, $Y^2$, z, y, $R^{t2}$, $L^{H2}$, and $L^{C2}$ are as defined above.

In further embodiments, Re can be a *-$L^2(A^2)_2$ group and $R^d$ can be a *-$L^2$-$A^2$ group, while in other embodiments, Re can be a *-$L^2$-$A^2$ group and $R^d$ can be a *-$L^2$-$(A^2)_2$ group.

In some preferred embodiments, $L^{H2}$ is null and $Z^2$ is the terminal sialoside. Further embodiments include compounds in which $L^{C2}$ is a linker and $Y^2$ is $A^2$.

Cleavable linkers for $L^{H2}$ and $L^{C2}$ groups include hydrazone groups, capthesin B-responsive groups, β-glucuronidase-responsive groups, disulfide groups, or pyrophosphate diester groups.

In some instances, the *-$L^2$-$A^2$ group can have the formula:

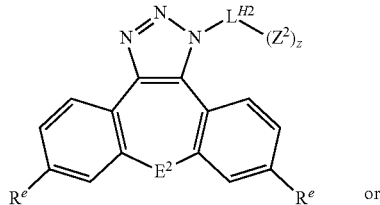

Methods of Making Dual Drug ADC

The dual drug ADCs disclosed herein can be obtained by selectively glycosylating an N-linked oligosaccharide with a first functionalized sialoside and then a second functionalized sialoside. In certain embodiments, an N-linked oligosaccharide having a G2 glycoform can be glycosylated with a first functionalized sialoside and then a second functionalized sialoside. If desired, the N-linked oligosaccharide can be converted to the G2 glycoform by treatment with galactosyl transferase (GalT) and UDP-Gal in the presence of calf intestine alkaline phosphatase (CIAP). In certain embodiments, it is preferred that substantially all of the N-linked oligosaccharide, for instance at the Asn297 position, is in the G2 glycoform. The N-linked oligosaccharide can be glycosylated at the C-3 arm with a first glycosyl donor, wherein the first glycosyl donor comprises at least one clickable group. Preferred clickable group include azides, 1,2,4,5 tetrazines, cyclooctynes, and trans cyclooctenes.

Preferred first glycosyl donors include functionalized sialoside donors. As used herein, a functionalized sialoside includes at least one clickable group covalently bonded to the sialic acid molecule. In some embodiments, the first glycosyl donor can be a compound having the formula:

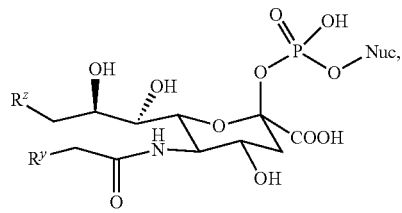

wherein Nuc represents a nucleoside (for instance, cytosine), $R^Z$ is selected from —OH and *-$L^{H1'}$-Q, $R^y$ is selected from H and *-$L^{H1'}$-Q, wherein -$L^{H1'}$- is selected from null, cleavable linker, and non-cleavable linker null, and Q is a clickable group, providing that at least one *-L$^{H1'}$-Q is present. Suitable Q group include azide (N$_3$), and groups having the formula:

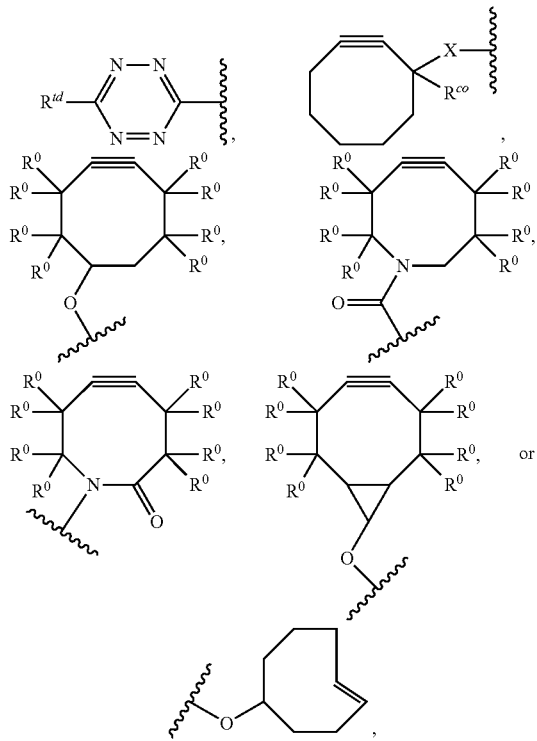

wherein X, R$^{co}$, and R$^0$ are as defined above and R$^{td}$ is hydrogen, C$_{1-8}$alkyl, C$_{1-8}$alkoxy, aryl, C$_{1-8}$heteroaryl, C$_{3-8}$cycloalkyl, or C$_{1-8}$heterocyclyl.

In some instances, the first glycosyl donor can be a sialoside having the formula:

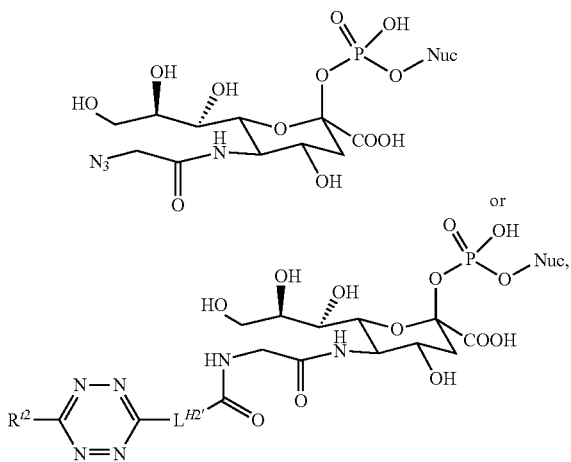

wherein L$^{H2'}$ is selected from null, cleavable linker, and non-cleavable linker.

In some embodiments, the stoichiometric ratio of the N-linked oligosaccharide to first glycosyl donor can be from 1:1 to 1:8, from 1:1 to 1:6, from 1:1 to 1:5, from 1:2 to 1:5, or from 1:3 to 1:5.

In certain embodiments, after glycosylation with the first glycosyl donor, the first cargo moiety can be conjugated by conducting a cycloaddition reaction between the N-linked oligosaccharide and a first cargo donor. The first cargo donor includes a functional group that reacts with the Q group on the first functionalized sialoside. For instance, when the sialoside includes an azide or tetrazine group, the cargo donor can include a cyclooctyne or trans-cyclooctene group. Similarly, when the sialoside includes a cyclooctyne or trans-cyclooctene group, the cargo donor can include an azide or tetrazine.

After the first cycloaddition reaction, the N-linked oligosaccharide can be glycosylated with a second glycosyl donor. Preferred second glycosyl donors include functionalized sialoside donors. In some embodiments, the second glycosyl donor can be a compound having the formula:

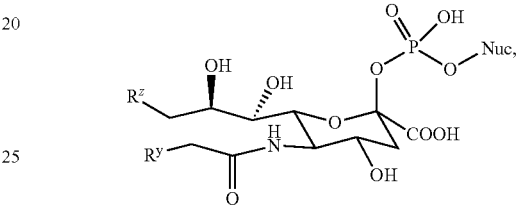

wherein Nuc, R$^z$, R$^y$, L$^{H1'}$ and Q are as defined above, providing that at least one *-L$^{H2'}$-Q is present. The second glycosyl donor can be the same or different as the first glycosyl donor. After the second glycosyl donor is installed, the second cargo moiety can be conjugated by conducting a second cycloaddition reaction between the N-linked oligosaccharide and a second cargo donor. The second cargo donor includes a functional group that reacts with the Q group on the second functionalized sialoside. For instance, when the second sialoside includes an azide or tetrazine, the second cargo donor can include a cyclooctyne or trans-cyclooctene group. Similarly, when the second sialoside includes a cyclooctyne or trans-cyclooctene group, the second cargo donor can include an azide or tetrazine. An exemplary process schematic is depicted in FIG. 4 using a taxoid cargo donor (D$^1$) and zosuquidar-derived cargo donor (D$^2$). Reagents and conditions: a) UDP-Gal, galactosyltransferase, MOPS buffer, pH 7.2; b) azide functionalized sialoside, ST6Gal1, CLAP; c) (D$^1$); d) azide functionalized sialoside, ST6Gal1, CIAP; e) (D$^2$). The reactions for a-e were performed in cacodylate buffer, pH 7.6.

In certain embodiments, the Q groups can be selected such that the first and second cycloaddition reactions are conducted simultaneously. For instance, the Q group in the first glycosyl donor can include an azide (donor 1, FIG. 5A), and the Q group in the second glycosyl donor can include a tetrazine (donor 2, FIG. 5A). After each functionalized sialoside is installed onto the N-linked oligosaccharide, the compound can be combined with both a first cargo donor including a cyclooctyne, and a second cargo donor including a trans-cyclooctene. This glycosylation process is depicted in FIG. 5A, the specific sialoside donors are depicted FIG. 5B, and the conjugation reactions are depicted in FIG. 5C.

The processes disclosed herein are highly suitable for the producing homogeneous dual-drug ADCs since toxic metals are not required and all steps proceed very efficiently at ambient temperature. Unlike other approaches for the site-specific conjugation with separate reagents, the new approach does not require site-specific amino acid mutation or other genetic modifications and relies on simple transformations.

The dual-drug ADCs disclosed herein can be used to treat a variety of conditions, especially cancer and multidrug resistant cancer. For instance, the ADCs disclosed herein can be used to treat adrenocortical carcinoma, bladder cancer, bone cancer, breast cancer, central nervous system atypical teratoid/rhabdoid tumors, colon cancer, colorectal cancer, embryonal tumors, endometrial cancer, esophageal cancer, gastric cancer, head and neck cancer, hepatocellular cancer, Kaposi sarcoma, liver cancer, lung cancer, including small cell lung cancer and non-small cell lung cancer, ovarian cancer, rectal cancer, rhabdomyosarcomasmall intestine cancer, soft tissue sarcoma, squamous cell carcinoma, squamous neck cancer, stomach cancer, uterine cancer, vaginal cancer, and vulvar canceradrenocortical carcinoma, bladder cancer, bone cancer, breast cancer, central nervous system atypical teratoid/rhabdoid tumors, colon cancer, colorectal cancer, embryonal tumors, endometrial cancer, esophageal cancer, gastric cancer, head and neck cancer, hepatocellular cancer, Kaposi sarcoma, liver cancer, lung cancer, including small cell lung cancer and non-small cell lung cancer, ovarian cancer, rectal cancer, rhabdomyosarcomasmall intestine cancer, soft tissue sarcoma, squamous cell carcinoma, squamous neck cancer, stomach cancer, uterine cancer, vaginal cancer, or vulvar cancer.

In further embodiments, the dual drug ADCs disclosed herein can be used to treat a patient having cancer refractory to one or more previously administered chemotherapeutics. Additionally, the dual drug ADCs can be administered to a patient not exhibiting multidrug resistance, in such cases the dual drug ADC prevents the development of multidrug-resistance.

The dual drug ADCs disclosed herein can be administered as a pharmaceutical composition containing at least one pharmaceutically suitable ingredient. For example, the pharmaceutical composition above typically contains at least one pharmaceutical carrier (for example, sterilized liquid). Herein, the liquid includes, for example, water and oil (petroleum oil and oil of animal origin, plant origin, or synthetic origin). The oil may be, for example, peanut oil, soybean oil, mineral oil, or sesame oil. Water is a more typical carrier when the pharmaceutical composition above is intravenously administered. Saline solution, an aqueous dextrose solution, and an aqueous glycerol solution can be also used as a liquid carrier, in particular, for an injection solution. A suitable pharmaceutical vehicle is known in the art. If desired, the composition above may also contain a trace amount of a moisturizing agent, an emulsifying agent, or a pH buffering agent.

EXAMPLES

The following examples are for the purpose of illustration of the invention only and are not intended to limit the scope of the present invention in any manner whatsoever.

General reagents and materials. Succinic anhydride, pyridine, tris (ethylene glycol)-1,8-diamine, triethylamine, 1-[Bis(dimethylamino)methylene]-1H-1,2,3-triazolo[4,5-b]pyridinium 3-oxid hexafluorophosphate (HATU), N,N-diisopropylethylamine (DIPEA), trityl chloride, N-(3-Dimethylaminopropyl)-N'-ethylcarbodiimide hydrochloride (EDC), dimethylamino pyridine (DMAP), N-azidoacetyl-D-mannosamine, sodium pyruvate, sodium L-ascorbate, trifluoroacetic acid (TFA), and triisopropylsilane (TIPS) were purchased from Sigma Aldrich. Paclitaxel and zosuquidar were purchased from LC laboratory and Apex Biotechnology Inc. Mannoseamine hydrochloride was purchased from Carbosynth LLC. Dichloromethane (DCM) was freshly distilled under a nitrogen atmosphere. Other organic solvents were purchased anhydrous and used without further purification. Unless otherwise noted, all reactions were carried out at room temperature (RT) in oven-dried glassware with magnetic stirring. Organic solutions were concentrated under reduced pressure with bath temperatures <40° C. Flash column chromatography was carried out on silica gel G60 (Silicycle, 60-200 μm, 60 Å). Thin-layer chromatography (TLC) was carried out on Silica gel 60 F254 (EMD Chemicals Inc.) with detection by UV absorption (254 nm) where applicable, and by spraying with 20% sulfuric acid in ethanol followed by charring at ~150° C. or by spraying with a solution of $(NH_4)_6Mo_7O_{24} \cdot H_2O$ (25 g L$^{-1}$) in 10% sulfuric acid in ethanol followed by charring at ~150° C.

General methods for compound characterization. $^1$H and $^{13}$C NMR spectra were recorded on a Varian Inova-300 (300/75 MHz), a Varian Inova-500 (500 MHz) and a Varian Inova-600 (600/150 MHz) spectrometer equipped with sun workstations. Multiplicities are quoted as singlet (s), doublet (d), doublet of doublets (dd), triplet (t) or multiplet (m). NMR signals were assigned on the basis of $^1$H NMR, gCOSY and gHSQC experiments. Chemical shifts are quoted on the δ-scale in parts per million (ppm). Residual solvent signals were used as an internal reference. Mass spectra were recorded on an Applied Biosystems 5800 MALDI-TOF or Shimadzu LCMS-IT-TOF mass spectrometer. The matrix used was 2,5-dihydroxy benzoic acid (DHB).

Biochemical reagents. CD22 antibody (HD239) was purchased from Santa Cruz. Biotechnology, Inc. Peptide N-glycosidase F was purchased from New England BioLabs. Recombinant rat α-(2,6)-sialyltransferase (ST6Gal I) were prepared by reported procedures.[1] Sialic acid aldolase, CMP-sialic acid synthetase, and calf intestine alkaline phosphatase were purchased from Sigma Aldrich and Chemily.

One-Pot Two-Enzyme System Approach for Synthesis of Compound 1

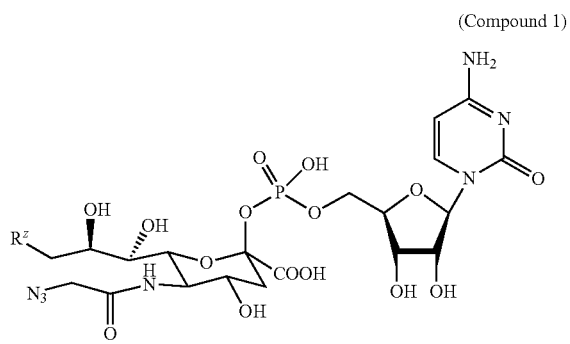

(Compound 1)

Sialic acid aldolase (0.2 U/μL, 5 μL) and CMP-sialic acid synthetase (0.2 U/μL, 5 μL) were added to a mixture of N-azidoacetyl-D-mannosamine (5 mg, 0.019 mmol) in Tris-HCl buffer (100 mM, pH 8.9, 20 mM MgCl$_2$, 1.9 mL), containing sodium pyruvate (10.5 mg, 0.095 mmol) and CTP (10 mg, 0.019 mmol). The mixture was incubated at 37° C., and progress of the reaction was monitored by TLC (EtOH:NH$_4$HCO$_{3\ (aq.)}$ (1 M) 7:3, v:v), which after 5 h indicated completion of the reaction. EtOH (3 mL) was added, and the precipitate was removed by centrifugation and the supernatant was concentrated under reduced pressure. The residue was redissolved in distilled water (500 μL) followed by lyophilization to provide a crude material that was applied to a Biogel fine P-2 column (50×1 cm, eluted with 0.1 M NH$_4$HCO$_3$ at 4° C. in dark). TLC detected the product, and appropriate fractions were combined and lyophilized to provide 1 as an amorphous white solid (10.1 mg, 81%).

$^1$H NMR (500 MHz, D$_2$O) δ 7.86 (d, J=7.6 Hz, 1H, H-6, cyt), 6.02 (d, J=7.5 Hz, 1H, H-5, cyt), 5.88 (d, J=4.5 Hz, 1H, H-1, rib), 4.27 4.19 (m, 2H, H-2+H-3, rib), 4.12 (dd, J=9.1, 7.6 Hz, 4H), 4.08 3.97 (m, 3H, H-4+N$_3$CH$_2$CO), 3.92 (t, J=10.3 Hz, 1H), 3.83 (ddd, J=9.4, 6.5, 2.6 Hz, 1H), 3.78 (dd, J=11.8, 2.5 Hz, 1H), 3.52 (dd, J=11.9, 6.6 Hz, 1H), 3.34 (dd, J=9.6, 1.2 Hz, 1H), 2.40 (dd, J=13.2, 4.8 Hz, 1H, H-3 eq), 1.55 (ddd, J=13.3, 11.3, 5.8 Hz, 1H, H-3ax). HRMS (ESI): m/z calcd for C$_{20}$H$_{30}$N$_7$O$_{16}$P [M−H]$^−$: 654.1414; found: 654.2023.

Synthetic Procedures for Compound 2

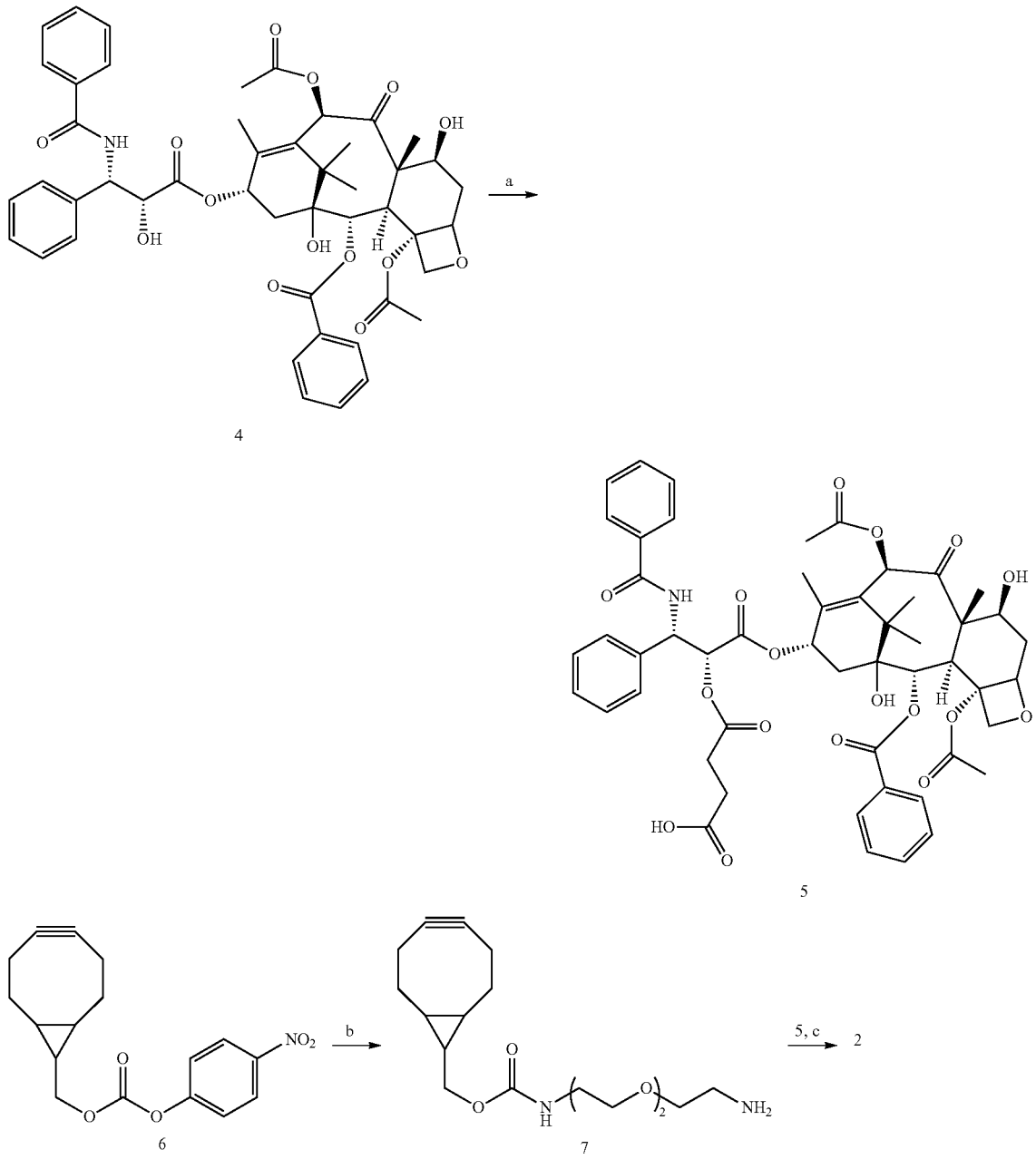

-continued

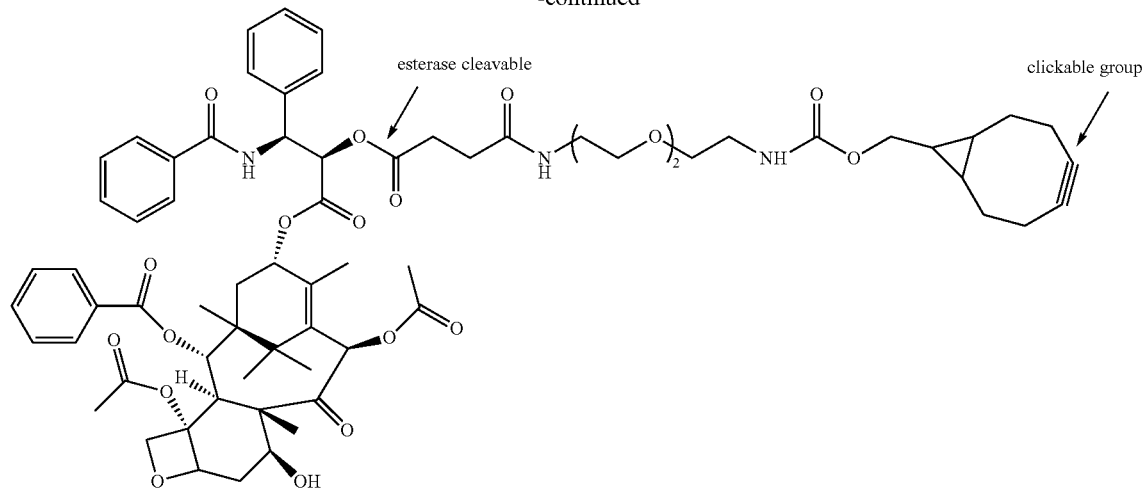

4-(((1S,2R)-1-benzamido-3-(((4S,4aS,6R,9S,11S, 12S,12aR,12bS)-6,12b-diacetoxy-12-(benzoyloxy)- 4,11-dihydroxy-4a,8,13,13-tetramethyl-5-oxo-2a,3,4, 4a,5,6,9,10,11,12,12a,12b-dodecahydro-1H-7,11- methanocyclodeca[3,4]benzo[1,2-b]oxet-9-yl)oxy)- 3-oxo-1-phenylpropan-2-yl)oxy)-4-oxobutanoic acid (5)

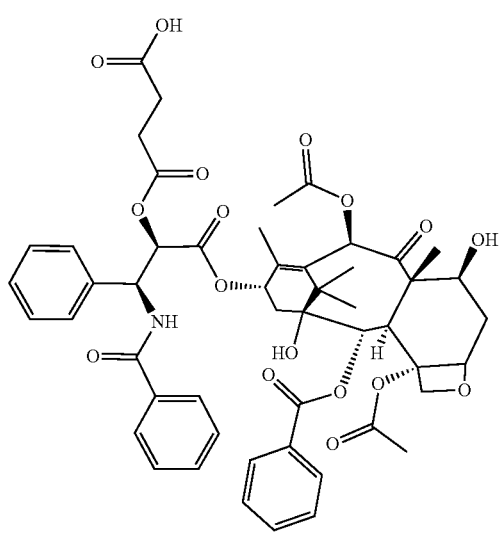 [SMILES: CC(=O)O[C@H]1C(=O)[C@]2(C)[C@@H](O)CC3OC[C@@]3(OC(C)=O)[C@H]2[C@H](OC(=O)c2ccccc2)[C@]2(O)C[C@H](OC(=O)[C@H](OC(=O)CCC(=O)O)[C@@H](NC(=O)c3ccccc3)c3ccccc3)C(C)=C1C2(C)C]

A reaction of mixture 4 (0.05 g, 0.06 mmol) and succinic anhydride (0.076 g, 0.76 mmol) in 1.2 mL pyridine was stirred at RT for 3 h. After 3 h, pyridine was evaporated to dryness in vacuo. The residue was then treated with 2 ml of water, stirred for 20 min, and filtered. The obtained precipitate was then dissolved in acetone and water was added slowly, and the fine crystals of product were collected. This yielded 0.048 g (86%) of 5.

$^1$H NMR (DMSO-d6, 500 MHz): δ 12.25 (br s, 1H), 9.19 (d, 1H), 7.94-8.00 (d, 2H), 7.81-7.85 (d, 2H), 7.70-7.73 (m, 1H), 7.63-7.66 (m, 2H), 7.49-7.56 (m, 1H), 7.45-7.50 (m, 2H), 7.40-7.44 (m, 4H), 7.11-7.21 (m, 1H), 6.27 (s, 1H), 5.76-5.83 (t, 1H), 5.73 (s, 1H), 5.50-5.54 (t, 1H), 5.40 (d, 1H), 5.34 (d, 1H), 4.88-4.90 (d, 2H), 4.61 (s, 1H), 4.08-4.11 (m, 1H), 3.97-4.02 (m, 2H), 3.56 (d, 1H), 2.57-2.63 (t, 2H), 2.27-2.37 (m, 1H), 2.22 (s, 3H), 2.09 (s, 3H), 1.76-1.83 (m, 1H), 1.74 (s, 3H), 1.58-1.65 (t, 1H), 1.48 (s, 3H), 1.21 (s, 1H), 0.95-1.00 (d, 6H).

$^{13}$C NMR 134, 131.9, 130, 129.2, 129.20, 129.09, 128.85, 128.09, 127.93, 84.15, 75.76, 75.11, 75, 75.14, 71.41, 71, 55.34, 54.43, 46.51, 40.28, 37.11, 37, 34.86, 34.86, 29.28, 29, 26.74, 23.11, 22.05, 21.16, 14.39, 10.63, 10.33. MALDI HRMS for $C_{51}H_{55}NO_{17}$ m/z [M+Na$^+$]976.35; found 976.346.

Bicyclo[6.1.0]non-4-yn-9-ylmethyl (4-nitrophenyl) carbonate (6)

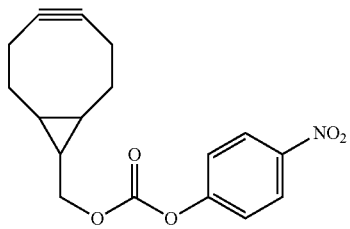 [SMILES: O=C(OCC1C2CCC#CCCC21)Oc1ccc([N+](=O)[O-])cc1]

To a solution of ((1R, 8S, 9r)-Bicyclo [6.1.0] non-4-yn- 9-ylmethanol (100 mg, 0.66 mmol) in CH$_2$Cl$_2$ (10 mL) was added pyridine (134.70 µL, 1.66 mmol) and 4-nitrophenyl chloroformate (200 mg, 1 mmol). After stirring for 3 h at RT the reaction mixture was quenched with saturated ammonium chloride solution (10 mL) and extracted with $CH_2Cl_2$ (3×10 mL). The organic layer was dried using $MgSO_4$ and concentrated in vacuo. The residue was further purified by column chromatography on silica gel (EtOAc:Hexane, 1:5) to afford desired product 6 (162 mg, 77%) as a white solid.

$^1$H NMR ($CDCl_3$, 500 MHz): δ 8.28 (d, 2H), 7.40 (d, 2H), 4.31 (d, 2H), 2.15-2.5 (m, 6H), 1.35-1.45 (m, 2H), 0.64-0.75 (m, 3H). $^{13}$C NMR (150 MHz, $CDCl_3$): δ 155.6, 152.5, 145.3, 125.3, 121.7, 98.7, 68.0, 29.0, 21.3, 20.5, 17.2.

((1R, 8S, 9r)-Bicyclo [6.1.0] non-4-yn-9-ylmethyl (2-(2-(2-aminoethoxy) ethoxy) ethyl) carbamate (7)

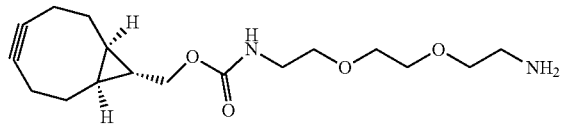 [SMILES: NCCOCCOCCNC(=O)OC[C@H]1[C@@H]2CCC#CCC[C@@H]21]

$Et_3N$ (339 µL, 1.945 mmol) solution of 6 (150 mg, 0.389 mmol) and tris (ethylene glycol)-1,8-diamine (569 µL, 3.89 mmol) in $CH_2Cl_2$ (10 mL). The reaction mixture was stirred for 3 h, after which the solvent was removed under reduced pressure. The residue was purified by flash chromatography over Iatrobeads (MeOH/$CH_2Cl_2$, 5 to 25%, v/v) to give compound 7 as a light-yellow liquid (116 mg, 92%).

$^1$H NMR ($CDCl_3$, 500 MHz): δ 5.48 (br s, NH), 4.15 (d, 2H), 3.5-3.75 (m, 8H), 3.4 (br s, 2H), 2.9 (br s, 2H), 2.5 (br s, 2NH$_2$), 2.16-2.36 (m, 6H), 1.5-1.65 (m, 2H), 1.2-1.44 (m and s, 3H), 0.79-1.00 (m, 2H) $^{13}$C NMR (150 MHz, $CDCl_3$): δ 98.8, 73.4, 70.3, 70.2, 70.1, 62.7, 41.7, 40.8, 29.1, 21.4, 20.1, 17.8. MALDI HRMS for $C_{17}H_{28}N_2O_4$ m/z calcd (M+H)$^+$ 325.2124, found: 325.2122.

(4S,4aS,6R,9S,11S,12S,12aR,12bS)-9-(((19R)-19-((S)-benzamido(phenyl)methyl)-1-(bicyclo[6.1.0] non-4-yn-9-yl)-3,14,17-trioxo-2,7,10,18-tetraoxa-4, 13-diazaicosan-20-oyl)oxy)-12-(benzoyloxy)-4,11-dihydroxy-4a,8,13,13-tetramethyl-5-oxo-3,4,4a,5,6, 9,10,11,12,12a-decahydro-1H-7,11-methanocyclodeca[3,4]benzo[1,2-b]oxete-6,12b (2aH)-diyl diacetate (2)

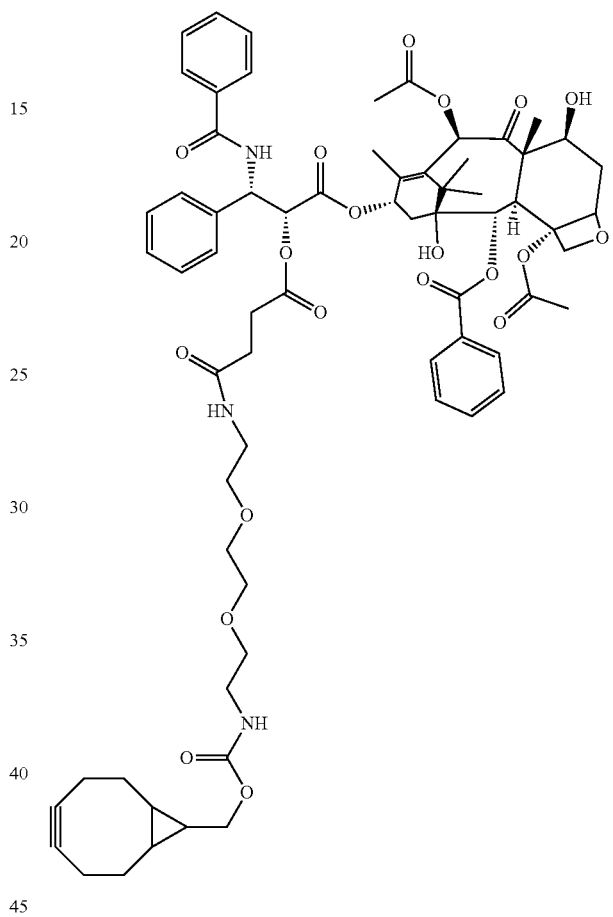

A mixture of 5 (5 mg, 0.0052 mmol) and 7 (2.1 mg, 0.0062 mmol) was dissolved in anhydrous DMF (1 mL). N, N-diisopropylethylamine (2.73 µL, 0.0157 mmol) and 1-[Bis(dimethylamino) Methylene]-1H-1,2,3-triazolo [4,5-b] pyridinium 3-oxid hexafluorophosphate (HATU, 3 mg, and 0.00786 mmol) was added sequentially and reaction mixture was stirred for 2 h at RT. TLC showed complete reaction after stirring reaction for 2 h at RT. Solvents were evaporated under reduced pressure, and the crude product was purified by silica gel chromatography using EtOAc: Hexane (5 to 15%, v/v) as a mobile phase giving pure 2 as a white solid (6.5 mg, 98%).

$^1$H NMR ($CDCl_3$, 500 MHz): δ 8.15 (d, 1H), 7.83 (d, 1H), 7.63 (t, 1H), 7.52 (dt, 2H), 7.48 7.37 (m, 3H), 7.32 (s, 1H), 6.30 (s, 1H), 6.25 6.13 (m, 1H), 5.69 (d, 1H), 5.46 (d, 0H), 5.31 (s, 0H), 5.03 4.92 (m, 0H), 4.32 (d, 1H), 4.21 (d, 1H), 4.13 (q, 1H), 3.96 (d, 1H), 3.81 (d, 1H), 3.60 (d, 4H), 3.48 (s, 1H), 3.37 (s, 2H), 2.77 (t, 1H), 2.54 (d, 2H), 2.44 (s, 1H), 2.39 (d, 1H), 2.35 2.28 (m, 1H), 2.24 (s, 2H), 2.15 (d, 1H), 2.06 (s, 1H), 1.93 (s, 2H), 1.69 (s, 2H), 1.64 (s, 4H), 1.50 (dd, 3H), 1.33 1.20 (m, 5H), 1.14 (s, 2H), 0.93 0.85 (m, 1H), 0.73 (s, 1H).

$^{13}$C NMR (150 MHz, CDCl$_3$): δ 130.22, 127.36, 133.70, 128.72, 131.85, 126.78, 129.00, 128.43, 75.61, 71.74, 53.19, 75.08, 74.37, 84.43, 72.10, 76.42, 76.42, 69.23, 45.60, 70.23, 69.77, 39.36, 40.73, 43.72, 29.44, 35.13, 30.76, 22.68, 33.27, 35.47, 21.39, 21.39, 35.48, 14.82, 35.57, 9.62, 23.39, 9.62, 18.63, 17.32, 33.28, 22.68, 31.61, 29.66, 26.80, 22.13, 14.12, 22.87, 23.69. MALDI HRMS for C$_{68}$H$_{81}$N$_3$O$_{20}$ m/z calcd (M+Na)$^+$ 1282.54, found: 1282.534.
Synthetic Procedure for Compound 3
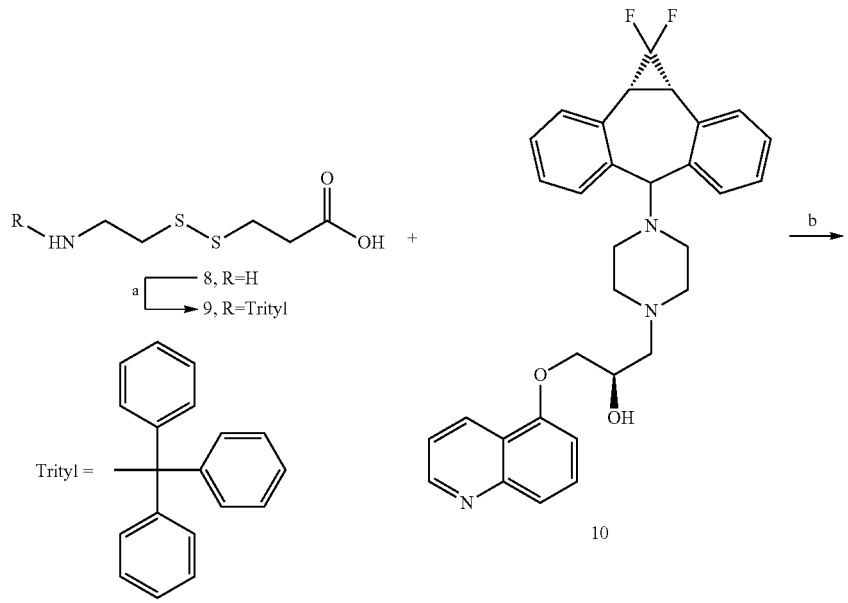
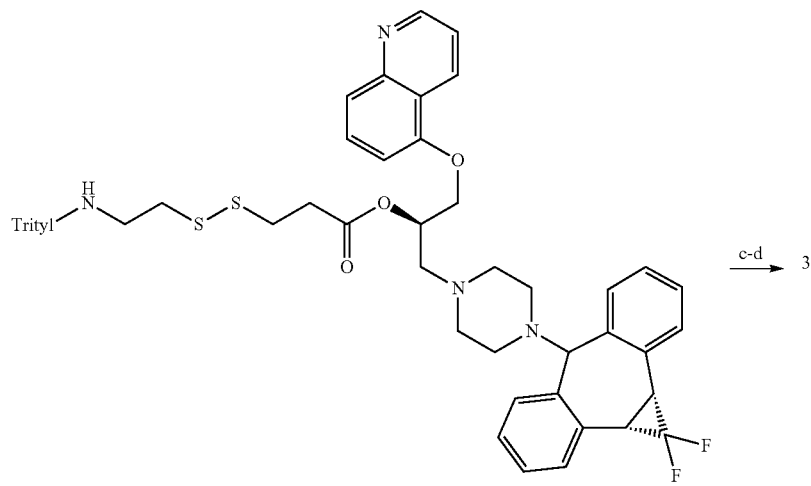

-continued

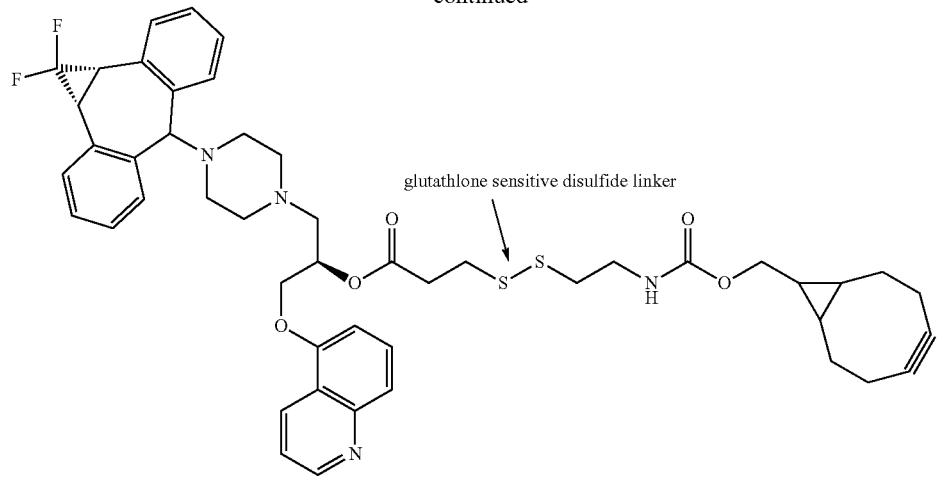

3

3-((2-(tritylamino)ethyl)disulfaneyl)propanoic acid (9)

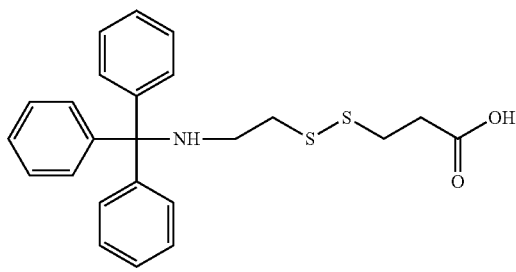 [SMILES: O=C(O)CCSSCCNC(c1ccccc1)(c1ccccc1)c1ccccc1]

Trityl group protected amino-ethyldithiopropanoic acid linker was prepared by adding trityl chloride (46 mg, 0.165 mmol) to the stirred solution of 8 (10 mg, 0.055 mmol) and triethylamine (16.7 mg, 23 µL, 0.165 mmol) in 1 mL dimethylformamide for 24 h at RT. After stirring the reaction mixture overnight, solvent was evaporated under reduced pressure, and the crude product was purified by silica gel chromatography using MeOH:DCM (2 to 5%, v/v) as a gradient column system to give compound 9 as yellow solid (19 mg, 82%).

$^1$H NMR (500 MHz, CDCl$_3$): δ 7.53 7.46 (m, 6H), 7.35 7.27 (m, 6H), 7.24 7.18 (m, 3H), 4.62 (s, 1H), 2.86 (t, 2H), 2.80 2.70 (m, 4H), 2.51 (t, 2H). MALDI HRMS for C$_{24}$H$_{25}$NO$_2$S$_2$ m/z calcd (M+H)$^+$ 424.14, found: 424.136.

(2R)-1-(4-((1aR,10bS)-1,1-difluoro-1,1a,6,10b-tetrahydrodibenzo[a,e]cyclopropa[c][7]annulen-6-yOpiperazin-1-yl)-3-(quinolin-5-yloxy)propan-2-yl 3-((2-(tritylamino)ethyl) disulfaneyl) propanoate (11)

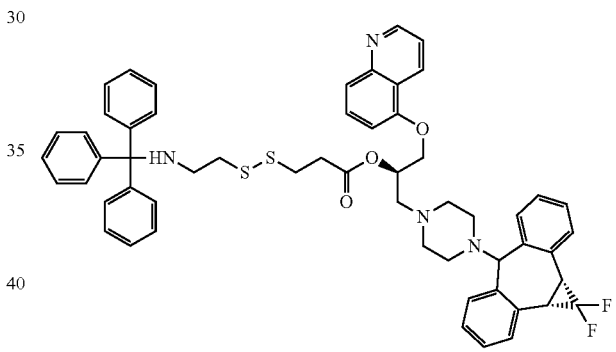

A reaction mixture of 9 (12 mcf (1284 mmol), N-(3-Dimethylaminopropyl)-N'ethylcarbodiimide hydrochloride (7.2 mg, 0.0376 mmol), catalytic amount of dimethyl amino pyridine (DMAP), and triethylamine (4.8 mg, 7 µL, 0.047 mmol) was dissolved in 2 ml CH$_2$Cl$_2$ and cooled to 0° C. Compound 10 (5 mg, 0.0094 mmol) was added at 0° C. and reaction mixture was stirred for 24 h at RT. After overnight stirring, reaction mixture was diluted with 8 ml CH$_2$Cl$_2$ and extracted with brine and saturated sodium bicarbonate (5 mL each) and dried over magnesium sulfate. Solvents were evaporated under reduced pressure and crude product was purified over silica gel chromatography using MeOH:DCM (0 to 3%, v/v) as gradient system to obtained pure compound 11 as beige solid (7 mg, 81%).

$^1$H NMR (500 MHz, CDCl$_3$): δ 8.90 (dd, 1H), 8.56 8.50 (m, 1H), 7.72 (d, 1H), 7.61 (t, 1H), 7.48 (d, 8H), 7.32 7.25 (m, 10H), 7.22-7.12 (m, 6H), 6.87 (d, 1H), 5.52 (dd, 1H), 5.32 (s, 1H), 4.35 (dd, 1H), 4.26 (dd, 2H), 4.15 (q, 1H), 3.92 (s, 1H), 3.20 (d, 2H), 2.92 2.67 (m, 8H), 2.64 2.23 (m, 10H), 2.09 (d, 1H).

$^{13}$C NMR (150 MHz, CDCl$_3$) δ 150.80, 130.75, 122.08, 129.23, 128.57, 128.57, 120.39, 127.87, 127.88, 132.70, 132.71, 127.94, 126.34, 129.26, 127.56, 105.18, 70.03, 53.43, 68.43, 68.43, 77.96, 28.96, 40.76, 40.38, 33.18, 33.90, 34.24, 58.07, 58.07, 53.69, 54.19, 41.74, 52.25. MALDI HRMS for $C_{56}H_{54}F_2N_4O_3S_2$ m/z calcd $(M+H)^+$ 933.36, found: 933.354.

(2R)-1-(4-(((1aR,10bS)-1,1-difluoro-1,1a,6,10b tetra-hydrodibenzo[a,e]cyclopropa[c][7]annulen-6-yl) piperazin-1-yl)-3-(quinolin-5 yloxy)propan-2-yl-3-(((2-(((bicyclo[6.1.0]non-4-yn-9-ylmethoxy) carbonyl)amino)ethyl)disulfaneyl)propanoate (3)

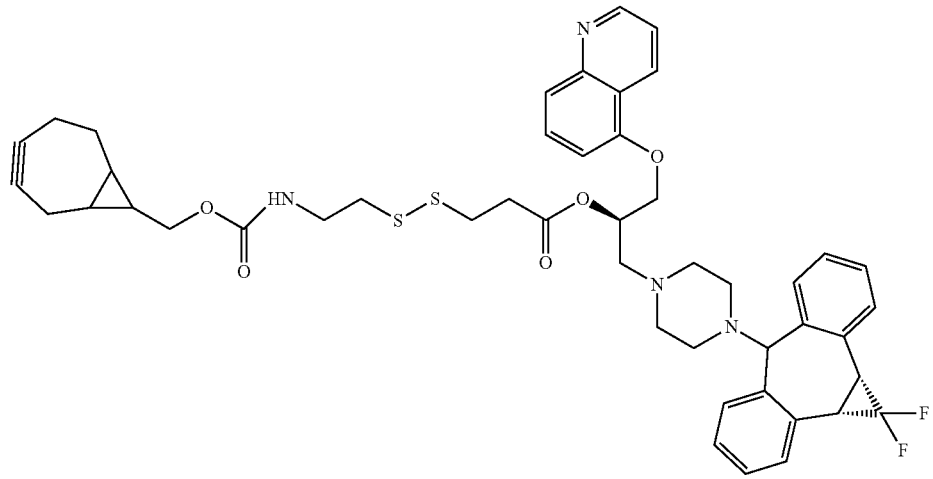 [SMILES: O=C(CCSSCCNC(=O)OCC1C2CC#CCCC21)O[C@@H](COc1cccc2ncccc12)CN1CCN(C2c3ccccc3[C@@H]3[C@H](c4ccccc42)C3(F)F)CC1]

Compound 11 (5 mg, 0.0053 mmol) was dissolved in 1 mL dichloromethane. 2% TFA and TIPS v/v were added to reaction mixture and stirred for 30 min at RT. After 30 min, solvent was evaporated under reduced pressure and resulting amino-TFA salt was used for the next step without purification. Next, amino-TFA salt was added to the reaction mixture containing 6 (2.53 mg, 0.008 mmol), N, N-diisopropylethylamine (2.1 mg, 3 μL, 0.016 mmol) in DMF and stirred for 16 h at RT. After stirring for 16 h, solvents were evaporated under reduced pressure and crude product was purified over silica gel column using mobile phase of MeOH:DCM (0 to 2% v/v) yielding compound 3 (4 mg, 89%) in excellent yields.

$^1$H NMR (600 MHz, CDCl$_3$): δ 8.90 (dd, 1H), 8.56 8.45 (m, 1H), 7.71 (d, 1H), 7.59 (t, 1H), 7.38 (dd, 1H), 7.25 7.22 (m, 1H), 7.22 7.17 (m, 3H), 7.12 (tdd, 5H), 6.86 (d, 1H), 5.55 (s, 2H), 5.10 (s, 1H), 4.38 4.22 (m, 2H), 3.95 (t, 3H), 3.49 3.37 (m, 2H), 3.34 (s, 2H), 3.16 (d, 2H), 2.90 (t, 2H), 2.82 2.69 (m, 4H), 2.46 2.00 (m, 9H), 0.90 0.77 (m, 4H), 0.76 0.61 (m, 3H). $^{13}$C NMR (151 MHz, CDCl$_3$) δ 130.92, 122.03, 129.42, 120.42, 77.11, 132.78, 128.12, 129.65, 127.68, 105.32, 76.87, 68.39, 68.40, 69.25, 70.03, 77.78, 39.58, 39.63, 56.01, 28.94, 33.10, 33.07, 38.31, 34.25, 38.14, 33.37, 33.33, 21.42, 21.41, 21.41, 33.37, 29.35, 31.71, 22.91, 23.69. MALDI HRMS for $C_{48}H_{52}F_2N_4O_5S_2$ m/z calcd $(M+Na)^+$ 889.33, found: 889.32.

Synthesis of Dual Drug ADC (with Reference to FIG. 4)

Analysis of Glycopeptides from Tryptic Digestion of Anti-CD22 Antibody

An aliquot of an IgG antibody was dried by Speed Vac (Savant SC 110) and re-dissolved in an ammonium bicarbonate buffer (50 mM, pH 8.4) and heated at 100° C. for 5 mM to denature the glycoprotein. After cooling the mixture to RT, trypsin (trypsin/IgG=1/30, w/w) was added and the solution was incubated at 37° C. for 22 h, after which it was heated to 100° C. for 5 min to deactivate trypsin. The solution was passed through a C18 reversed phase cartridge, washed with 5% aqueous acetic acid and eluted with a gradient of 2-propanol/5% acetic acid (20-100%) to give glycopeptides which were subjected to LCMS-IT-TOF Mass Spectrometer (Shimadzu) equipped with a XBridge-BEH amide-HILIC columns (Waters, Milford, MA, USA; 2.1× 150 mm, 3.5 μm particle size). These separations were carried out at a flow rate of 0.16 mL/min at 20° C., with a mobile phase A consisting of 100 mM ammonium formate in water (adjusted to pH 3.4-3.6 with formic acid) and mobile phase B as pure ACN.

Remodeling of the Glycans of Anti-CD22 Antibodies with β-1,4-Galactosyltransferase To the anti-CD22 antibody solution, UDP-galactose (10 mM), BSA (80 μg mL$^{-1}$), calf intestine alkaline phosphatase (85 U mL$^{-1}$) and bovine β-1,4-galactosyltransferase (100 mU mL$^{-1}$) were added at a final concentration of 30 mg mL$^{-1}$ IgG in MOPS buffer (50 mM, pH 7.2) containing MnCl$_2$ (20 mM). The resulting reaction mixture was incubated at 37° C. for 24 h. To ensure complete galactosylation, an additional aliquot of UDP galactose (4 mg) and galactosyltransferase (7 mU) were added and the reaction mixture was incubated at 37° C. for an additional 24 h. Galactosylated IgG was purified using a Protein A Sepharose Column (GE Healthcare).

Monosialylation of Anti-CD22 Antibody

To anti-CD22 antibody in cacodylate buffer (50 μL, 50 mM, pH 7.6), CMP-Neu5Ac5N$_3$ (various molar ratio of 1 to antibody), BSA (1%), calf intestine alkaline phosphatase (1.3%) and ST6Gal I (5 μL, 1.0 mg mL$^{-1}$) were added and the resulting mixture was incubated at 37° C. for 24 h. The antibody was purified by protein A sepharose column chromatography and the purified antibody was digested with trypsin. The resulting glycopeptides and peptides were separated and analyzed using HILIC LC-ESI as described above and resulted into complete monosialylation of antibody at a molar ratio of 4:1 of 1 to antibody (FIGS. 2 and 3).

Conjugation of Monosialylated Antibody with Compound 2

Compound 2 in DMF (16 μL, 5 mM, 2.5 eq.) was added to the anti-CD22 antibody (1.2 mg) in cacodylate buffer (190

µL, 50 mM, pH 7.6) and the mixture was incubated at RT for 9 h and passed through a spin filtration column to remove the excess of 2 to give 15 and the presence of unconjugated 2 in the purified antibody solution was monitored by MALDI-TOF mass spectrometry and no free 2 was detected in the solution of antibody after passing through the spin filtration column.

Further Sialylation of Antibody 15 and Conjugation with 3

To the solution of 15 (0.25 mg) in 230 µL of 50 mM cacodylate (pH 7.6), CMP-Neu5Ac5N$_3$ (0.5 mg, 0.76 mol), ST6GalI (40 µL, 1 mg/mL), BSA (1%) and calf intestine alkaline phosphatase (1.3%) were added and the mixture was incubated at 37° C. for 24 h followed by protein A column purification and the buffer of eluted antibody solution was exchanged to cacodylate buffer by spin filtration and taken up to 275 µL of 16. To the solution of 16, compound 3 (8 µL, 5 mM, 10 eq.) in DMF were added and the mixture was incubated at RT overnight followed by spin filtration purification to yield stable triazole linked dual-drug modified ADC 17.

Dual Drug ADCs are Effective Against Multidrug Resistant Cancer

Cell Lines and Culture

Namalwa 21 nM VCR (multidrug-resistant cells by exposure to vincristine (21 nM), and Namalwa wild type (ATCC CRL-1432) cells were cultured in ATCC-formulated RPMI-1640 medium with L-glutamine (2 mM), sodium bicarbonate (1.5 g L-1), glucose (4.5 g L$^{-1}$), HEPES (10 mM) and sodium pyruvate (1.0 mM). The media was supplemented with penicillin (100 U mL$^{-1}$) and streptomycin (100 µg mL$^{-1}$, Mediatech) and fetal bovine serum (FBS, 10%, BenchMark). Cells were maintained in a humid 5% CO$_2$ atmosphere at 37° C. and subcultured every 2-3 days.

Cytotoxicity Assay

Cytotoxicity of PCTX and compounds 2, 2& 10, 15 and 17 was determined using the MTT assay. On the day of exposure, exponentially growing cells were plated at 25,000 cells/well in 160 µL in 96-well tissue culture plates (Nunc). Cells were then incubated with medium (control) or compounds (20 µL, 10× in cell culture medium) at the indicated final concentrations (0.1-1000 nM). At 68 h, MTT reagent (5 mg mL$^{-1}$ in PBS, 20 µL/well) was added to each well. The plate was further incubated at 37° C. At 72 h the plate was centrifuged at 1400 rpm for 10 min at 4° C. and supernatants were carefully removed. DMSO (100 µL/well) was added to dissolve the water-insoluble formazan salt. The absorbance was measured at 545 nm using a microplate reader (BMG Labtech). Data points were collected in triplicate and expressed as normalized values for untreated control cells (100%). Data were fitted using Prism software (GraphPad Software, Inc).

Namalwa cells were incubated for 72 h with various concentrations of PCTX, compound 2, anti-CD22 conjugated to 2 (15) and the same antibody modified by 2 and 3 (17). As shown in FIG. 3A, PCTX (IC$_{50}$=2 nM) is more active than 2 (IC$_{50}$=26 nM) most likely due to the fact that time is required for cleavage of the ester linkage to make the active drug available. Furthermore, compound 2 alone or conjugated to the mAb (15) had similar EC$_{50}$ values indicating that cells readily internalize both preparations (IC$_{50}$=26 and 61 nM, respectively).

Compound 2 conjugated to a control antibody did not exhibit any cytotoxicity demonstrating selective delivery of the cytotoxic agent by the ADC (data not shown). As anticipated, the addition of compound 10 had no appreciable influence on the cytotoxicity of the mAb (IC$_{50}$=25 nM) because this cell line does not overexpress P-gp. Next, the cytotoxicity of the various compounds and conjugates was examined in a multidrug-resistant Namalwa cell line (MDR+ve). Compound 2 alone or conjugated to anti-CD22 (15) had no appreciable activity in this cell line most likely due to efflux of the drug by P-gp. Gratifyingly, modification of the mAb with a cytotoxic drug and inhibitor of P-gp (17) resulted in dose-dependent cytotoxicity with an IC$_{50}$ of 64 nM.

The compositions and methods of the appended claims are not limited in scope by the specific compositions and methods described herein, which are intended as illustrations of a few aspects of the claims and any compositions and methods that are functionally equivalent are intended to fall within the scope of the claims. Various modifications of the compositions and methods in addition to those shown and described herein are intended to fall within the scope of the appended claims. Further, while only certain representative compositions and method steps disclosed herein are specifically described, other combinations of the compositions and method steps also are intended to fall within the scope of the appended claims, even if not specifically recited. Thus, a combination of steps, elements, components, or constituents may be explicitly mentioned herein or less, however, other combinations of steps, elements, components, and constituents are included, even though not explicitly stated. The term "comprising" and variations thereof as used herein is used synonymously with the term "including" and variations thereof and are open, non-limiting terms. Although the terms "comprising" and "including" have been used herein to describe various embodiments, the terms "consisting essentially of" and "consisting of" can be used in place of "comprising" and "including" to provide for more specific embodiments of the invention and are also disclosed. Other than in the examples, or where otherwise noted, all numbers expressing quantities of ingredients, reaction conditions, and so forth used in the specification and claims are to be understood at the very least, and not as an attempt to limit the application of the doctrine of equivalents to the scope of the claims, to be construed in light of the number of significant digits and ordinary rounding approaches.

What is claimed is:

1. A functionalized antibody protein comprising an N-linked oligosaccharide, wherein the oligosaccharide comprises a conjugated first cargo moiety and a conjugated second cargo moiety that is different from the first cargo moiety, and wherein the N-linked has the formula:

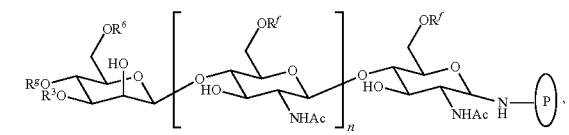

wherein:
P represents the protein;
R$^1$ is independently selected from hydrogen or fucose;
n is 0 or 1;
R$^g$ is selected from hydrogen or GlcNAc;
R$^3$ represents the conjugated first cargo moiety comprising an oligosaccharide comprising a first terminal sialoside, wherein said first terminal sialoside has the formula:

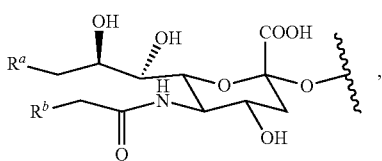

wherein $R^a$ is independently selected from —OH or *-$L^1$-$(A^1)_a$, and $R^b$ is independently selected from —H or *-$L^1$-$(A^1)_a$, wherein $L^1$ represents a first linker, $A^1$ represents a first cargo compound, and a is 1 or 2, provided at least one *-$L^1$-$(A^1)_a$ group is present; and $R^6$ represents the conjugated second cargo moiety comprising an oligosaccharide comprising a second terminal sialoside, said second terminal sialoside having the formula:

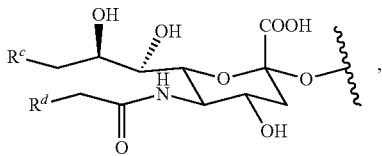

wherein $R^c$ is independently selected from —OH or *-$L^2$-$(A^2)_b$, and $R^d$ is independently selected from —H or *-$L^2$-$(A^2)_b$, wherein $L^2$ represents a second linker, $A^2$ represents a second cargo compound, and b is 1 or 2, provided at least one *-$L^2$-$(A^2)_b$ group is present.

2. The functionalized antibody protein according to claim 1, wherein $R^3$ has the formula:

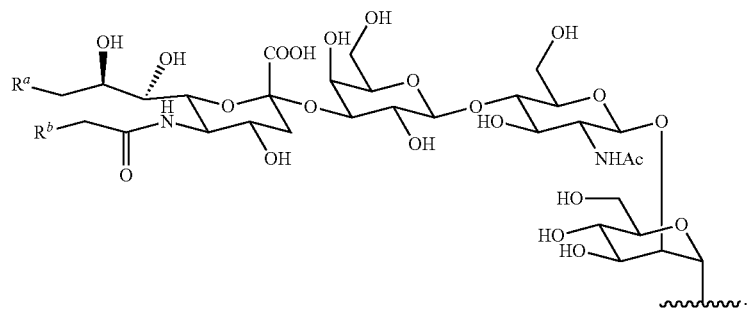

3. The functionalized antibody protein according to claim 2, wherein $R^a$ is hydroxyl and $R^b$ is $L^1$-$A^1$.

4. The functionalized antibody protein according to claim 2, wherein $L^1$ comprises a 1,2,3-triazole or 1,2-diazine fused to a ring having the formula:

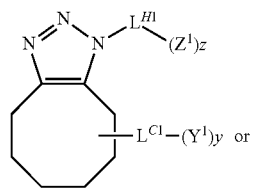 or

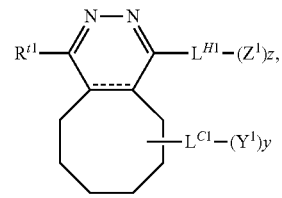

wherein one of $Z^1$ and $Y^1$ represents $A^1$ and the other represents the first terminal sialoside, wherein when $Z^1$ is $A^1$, then z is 1 or 2, and y is 1, and when $Y^1$ is $A^1$, then z is 1, and y is 1 or 2;

$R^{t1}$ represents hydrogen, $C_{1-8}$alkyl, $C_{1-8}$alkoxy, aryl, $C_{1-8}$heteroaryl, $C_{3-8}$cycloalkyl, $C_{1-8}$heterocyclyl, or, when $Z^1$ is $A^1$, another -$L^{H1}$-$(Z^1)_z$ group; and $L^{H1}$ and $L^{C1}$ are each independently selected from null, cleavable linker, and non-cleavable linker.

5. The functionalized antibody protein according to claim 4, wherein $L^{H1}$ comprises a cleavable linker comprising one or more hydrazone groups, capthesin β-responsive groups, β-glucuronidase-responsive groups, disulfide groups, or pyrophosphate diester groups, wherein $L^{C1}$ comprises a cleavable linker comprising one or more hydrazone groups, capthesin β-responsive groups, β-glucuronidase-responsive groups, disulfide groups, or pyrophosphate diester groups, or wherein both $L^{H1}$ and $L^{C1}$ comprise a cleavable linker comprising one or more hydrazone groups, capthesin B-responsive groups, β-glucuronidase-responsive groups, disulfide groups, or pyrophosphate diester groups.

6. The functionalized antibody protein according to claim 1, wherein $R^6$ has the formula:

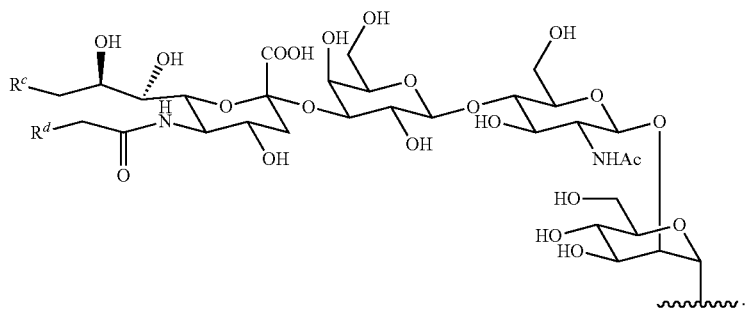

7. The functionalized antibody protein according to claim 6, wherein $R^c$ is hydroxyl and $R^d$ is $L^2$-$A^2$.

8. The functionalized antibody protein according to claim 6, wherein $L^2$ comprises a 1,2,3-triazole or 1,2-diazine fused to a ring having the formula:

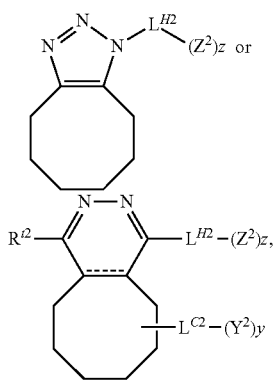

wherein one of $Z^2$ and $Y^2$ represents $A^2$ and the other represents the second terminal sialoside, wherein when $Z^2$ is $A^2$, then z is 1 or 2, and y is 1, and when $Y^2$ is $A^2$, then z is 1, and y is 1 or 2;

$R^{r2}$ represents hydrogen, $C_{1-8}$alkyl, $C_{1-8}$alkoxy, aryl, $C_{1-8}$heteroaryl, $C_{3-8}$cycloalkyl, $C_{1-8}$heterocyclyl, or, when $Z^2$ is $A^2$, another -$L^{H2}$-$(Z^2)_z$ group; and $L^{H2}$ and $L^{C2}$ are each independently selected from null, cleavable linker, and non-cleavable linker.

9. The functionalized antibody protein according to claim 4, wherein $L^{H2}$ comprises a cleavable linker comprising one or more hydrazone groups, capthesin β-responsive groups, β-glucuronidase-responsive groups, disulfide groups, or pyrophosphate diester groups, wherein $L^{C2}$ comprises a cleavable linker comprising one or more hydrazone groups, capthesin B-responsive groups, β-glucuronidase-responsive groups, disulfide groups, or pyrophosphate diester groups, or wherein both $L^{H2}$ and $L^{C2}$ comprise a cleavable linker comprising one or more hydrazone groups, capthesin B-responsive groups, β-glucuronidase-responsive groups, disulfide groups, or pyrophosphate diester groups.

10. The functionalized antibody protein according to claim 1, wherein the first cargo moiety comprises a cytotoxic compound, an antibiotic compound, an antiviral compound, or a reporter compound.

11. The functionalized antibody protein according to claim 10, wherein the first cargo moiety comprises a chemotherapeutic agent selected from an alkylating agent, a topoisomerase inhibitor, a mitotic inhibitor, an antimetabolite, an intercalating agent, a proteasome inhibitor, a tyrosine kinase inhibitor, an anti-tumor antibiotic.

12. The functionalized antibody protein according to claim 1, wherein the second cargo moiety comprises an ABC transport modulator, a DNA methylation inhibitor, a P-glycoprotein inhibitor, or an immune modulator.

13. A method of making the functionalized antibody protein according to claim 1, comprising the steps:
 a) selectively glycosylating an N-linked oligosaccharide comprising a G2 glycoform with a first glycosyl donor, wherein the first glycosyl donor comprises at least one clickable group;
 wherein the stoichiometric ratio of the N-linked oligosaccharide to first glycosyl donor is from 1:1 to 1:8;
 b) effecting a cycloaddition reaction between the clickable group present in the first glycosyl donor and a first cargo partner;
 c) glycosylating the N-linked oligosaccharide with a second glycosyl donor, wherein the second glycosyl donor comprises at least one clickable group; and
 d) effecting a cycloaddition reaction between the clickable group in the second glycosyl donor and a second cargo partner.

14. The method according to claim 13, wherein the clickable group in the first glycosyl donor is different than the clickable group in the second glycosyl donor, and step (d) is performed at the same time as step (b).

15. The method according to claim 13, wherein the clickable group comprises an azide, 1,2,4,5 tetrazine, cyclooctyne, or trans cyclooctene.

16. The method according to claim 13, wherein the first and second glycosyl donors are independently selected from a compound having the formula:

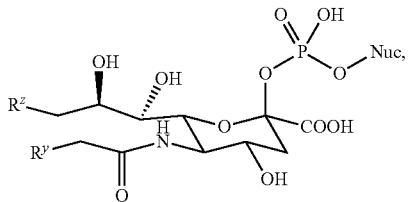

wherein Nuc represents a nucleoside, $R^z$ is selected from —OH and *-$L^{H1'}$-Q, $R^y$ is selected from H and *-$L^{H1'}$-Q, wherein $L^{H1'}$ is selected from null, cleavable linker, and non-cleavable linker null, and Q is a clickable group, providing that at least one *-$L^{H1'}$-Q is present.

17. The method according to claim 16, wherein Q comprises an alkyne, an azide, or a group having the formula:

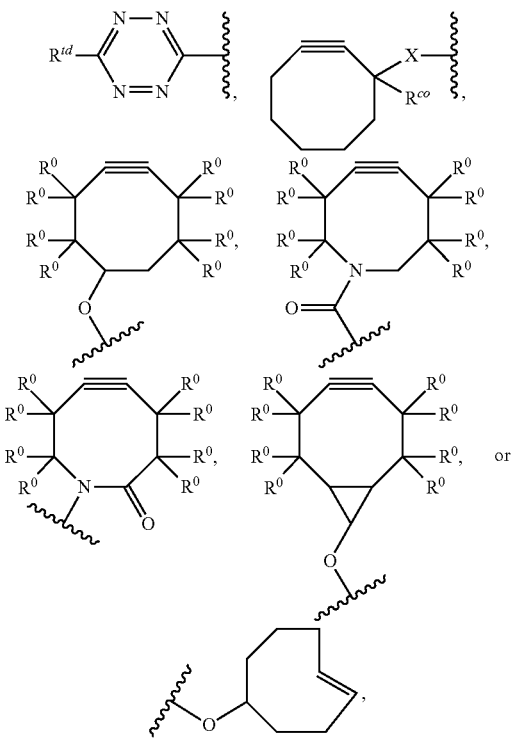

wherein $R^{co}$ is H, F, Cl, Br, or I;
X is null or O;
$R^0$ is in each case independently selected from hydrogen, halogen, $C_{1-8}$alkyl, $C_{1-8}$alkoxy, aryl, $C_{1-8}$heteroaryl, $C_{3-8}$cycloalkyl, or $C_{1-8}$heterocyclyl; wherein any two or more $R^0$ groups can together form a ring; and $R^{td}$ is hydrogen, $C_{1-8}$alkyl, $C_{1-8}$alkoxy, aryl, $C_{1-8}$heteroaryl, $C_{3-8}$cycloalkyl, or $C_{1-8}$heterocyclyl.

18. The method according claim 12, wherein the first glycosyl donor has the structure:

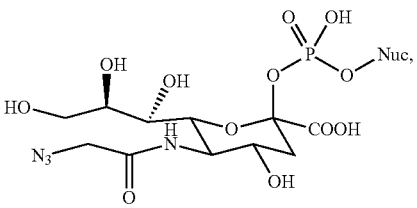

and
the second glycosyl donor has the structure:

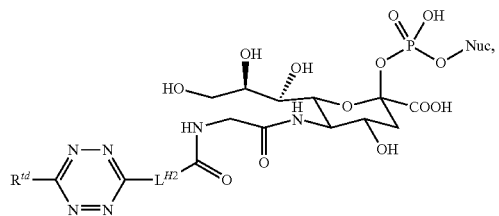

wherein $L^{H2'}$ is selected from null, cleavable linker, and non-cleavable linker; and
$R^{td}$ is hydrogen, $C_{1-8}$alkyl, $C_{1-8}$alkoxy, aryl, $C_{1-8}$heteroaryl, $C_{3-8}$cycloalkyl, or $C_{1-8}$heterocyclyl.

19. A dual-drug antibody drug conjugate, prepared by the process according to claim 13.

20. A method of treating cancer in a patient in need thereof, comprising administering to the patient an effective amount of the functionalized antibody protein according to claim 1.

* * * * *